(12) United States Patent  
Yim et al.

(10) Patent No.: US 11,102,343 B2  
(45) Date of Patent: Aug. 24, 2021

(54) MOBILE TERMINAL AND CONTROL METHOD THEREFOR

(71) Applicant: LG ELECTRONICS INC., Seoul (KR)

(72) Inventors: Soyeon Yim, Seoul (KR); Jinhee Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/766,604

(22) PCT Filed: Feb. 13, 2018

(86) PCT No.: PCT/KR2018/001897  
§ 371 (c)(1),  
(2) Date: May 22, 2020

(87) PCT Pub. No.: WO2019/160171  
PCT Pub. Date: Aug. 22, 2019

(65) Prior Publication Data  
US 2020/0389550 A1    Dec. 10, 2020

(51) Int. Cl.  
*H04M 1/72403* (2021.01)  
*G06F 3/0354* (2013.01)  
(Continued)

(52) U.S. Cl.  
CPC .... *H04M 1/72403* (2021.01); *G06F 3/03547* (2013.01); *G06F 3/0488* (2013.01); *G06F 3/04817* (2013.01); *H04M 2250/22* (2013.01)

(58) Field of Classification Search  
CPC ............... H04M 1/72522; H04M 1/72403  
See application file for complete search history.

(56) References Cited

U.S. PATENT DOCUMENTS

2010/0079395 A1    4/2010  Kim et al.  
2014/0282253 A1    9/2014  Zeng et al.  
(Continued)

FOREIGN PATENT DOCUMENTS

CN    105511680 A    4/2016  
CN    106502536 A    3/2017  
(Continued)

*Primary Examiner* — Hsinchun Liao  
(74) *Attorney, Agent, or Firm* — Birch, Stewart, Kolasch & Birch, LLP

(57) ABSTRACT

The present disclosure relates to a mobile terminal capable of sensing an operation for gripping a terminal, including: a main body having a case for forming an exterior; a memory for storing a plurality of pieces of visual information; a touch screen arranged at the front surface of the main body and displaying at least one of the plurality of pieces of visual information; a grip sensor arranged at a lateral surface of the main body and attached to an inner surface of the case so as to sense a user input applied to the lateral surface; and a control unit for executing a select-all function, which sets at least one of the pieces of displayed visual information into an editable selection state, on the basis of the sensing of the user input through the grip sensor during the execution of an editing mode for editing the plurality of pieces of visual information, wherein the control unit does not set remaining pieces of visual information, excluding at least one piece of displayed visual information, into the selection state even if the select-all function is executed.

17 Claims, 24 Drawing Sheets

(51) Int. Cl.
G06F 3/0481    (2013.01)
G06F 3/0488    (2013.01)

(56) References Cited

U.S. PATENT DOCUMENTS

2015/0355684 A1    12/2015  Nakamura
2017/0075444 A1*    3/2017  Nade .................. H04M 1/0268
2018/0088723 A1*    3/2018  Chien ................. G06F 3/04883

FOREIGN PATENT DOCUMENTS

| CN | 107153546 A | 9/2017 |
| CN | 107273012 A | 10/2017 |
| CN | 107479810 A | 12/2017 |
| JP | 2004-177993 A | 6/2004 |
| JP | 2016-220097 A | 12/2016 |
| JP | 2017-62712 A | 3/2017 |
| KR | 10-2013-0134782 A | 12/2013 |
| KR | 10-2016-0022881 A | 3/2016 |
| KR | 10-1631966 B1 | 6/2016 |

* cited by examiner (a)

(b)

(a)

(b)

(a)

[FIRST APP EXECUTED]

(b)

[FIRST APP STOPPED]

(a) [IDLE STATE]

(b) [CONFERENCE MODE EXECUTED]

[FIRST APP EXECUTED]

[FIRST APP STOPPED]

[IDLE STATE]

[CONFERENCE MODE EXECUTED]

MOBILE TERMINAL AND CONTROL METHOD THEREFOR

CROSS-REFERENCE TO RELATED APPLICATIONS

This application is the National Stage filing under 35 U.S.C. § 371 of International Application No. PCT/KR2018/001897 filed on Feb. 13, 2018, which is hereby expressly incorporated by reference into the present application.

TECHNICAL FIELD

The present disclosure relates to a mobile terminal capable of sensing an operation for gripping the terminal.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Recently, in order to simplify an appearance design and to control various functions of the mobile terminal, mobile terminals equipped with a grip sensor to sense a user input applied to a side surface of the terminal body have been released. The grip sensor is a sensor to sense pressure applied when a user grabs the mobile terminal.

As a new type of user input using the grip sensor becomes possible, there is an increasing need for a new type of user experience in controlling the mobile terminal in a new way in market.

SUMMARY

Technical Problem

One aspect of the present disclosure is to provide various user interfaces utilizing a user input applied by a grip sensor.

Technical Solution

The present disclosure relates to a mobile terminal provided with a main body provided with a case to define an exterior, a memory to store a plurality of pieces of visual information, a touch screen arranged at a front surface of the main body and displaying at least one of the plurality of pieces of visual information, a grip sensor arranged at a side surface of the main body and attached to an inner surface of the case so as to sense a user input applied to the side surface, and a controller to execute a select-all function for setting at least one of the pieces of displayed visual information to an editable-selected state, in response to a user input being sensed by the grip sensor during an execution of an editing mode to edit the plurality of pieces of visual information, wherein the controller does not set remaining pieces of visual information, excluding the displayed at least one visual information, to the editable-selected state even if the select-all function is executed.

In one embodiment, the controller determines a number of pieces of visual information to be displayed on the touch screen based on a preset type touch input being applied, and executes the select-all function, so that only the determined number of pieces of visual information stored in the memory is set to a selected state, based on a user input sensed by the grip sensor while the pieces of visual information are displayed by the determined number on the touch screen.

In one embodiment, the controller, based on a preset type touch input being applied while the pieces of visual information stored in the memory are displayed by a first number, reduces a number of visual information to be displayed on the touch screen, among the pieces of visual information stored in the memory by a second number which is smaller than the first number, and executes the select-all function so that the second number of pieces of visual information is all set to the selected state when a user input is sensed by the grip sensor while the second number of pieces of visual information is displayed.

In one embodiment, several items in list information are displayed on the touch screen, and the controller executes a scroll function to scroll the list information based on a drag input being applied on the touch screen while the several items are displayed on, and after the execution of the scroll function, selects the items displayed due to the execution of the scroll function in the list information upon sensing a user input by the grip sensor.

In one embodiment, the controller executes a release-all function, so that the plurality of pieces of visual information is set to a not-selected state based on a user input sensed by the grip sensor while the plurality of pieces of visual information is all selected.

In one embodiment, each of the plurality of pieces of visual information is information associated with different functions, and the controller activates or deactivates all of the different functions based on a user input sensed by the grip sensor.

In one embodiment, the touch screen further includes an input window on which characters input by a user control command are displayed, wherein the controller executes the select-all function, so that the characters displayed on the input window are all selected based on a user input sensed by the grip sensor.

In one embodiment, the mobile terminal further includes a proximity sensor to sense an object located near the touch screen and a gyro sensor to sense a tilt of the main body. Wherein the controller stops the execution of the specific function upon sensing a user input by the grip sensor, when the object located near the touch screen is sensed and a specific function is executed while the main body is in a horizontal state, and executes a silent mode to control an alarm not to output audible sound when the object located near the touch screen is sensed and the mobile terminal is in an idle state while the main body is in the horizontal state.

In one embodiment, the mobile terminal includes a proximity sensor to sense an object located near the touch screen, a gyro sensor to sense a tilt of the main body, and an illumination sensor to sense peripheral illumination of the touch screen. Wherein the controller stops the execution of the specific function while a user input is sensed by the grip sensor, when an object located near the touch screen is sensed, the main body is not in a horizontal state, and a peripheral illuminance of the touch screen is equal to or less than a reference value. And the controller executes a silent mode to control an alarm not to output audible sound, in response to a user input being sensed by the grip sensor, when an object located near the touch screen is sensed, the main body is not in a horizontal state, a peripheral illuminance of the touch screen is equal to or less than a reference value, and the mobile terminal is in an idle state in which a specific function is not executed.

In one embodiment, the mobile terminal further includes an acceleration sensor to sense an acceleration of the main body, and wherein the touch screen is in a rectangular shape in which a first side thereof is longer than a second side thereof, the main body takes either a portrait posture in which the first side is positioned in a direction parallel to a gravitational direction or a landscape posture in which the first side is positioned in a direction perpendicular to the gravitational direction, and the controller changes a display direction of the visual information displayed on the touch screen upon sensing that the posture of the main body is changed from the portrait posture to the landscape posture and sensing a user input by the grip sensor in the landscape posture.

In one embodiment, the controller takes a display mode of the visual information back to a previous state, upon sensing that the posture of the main body is changed from the landscape posture to the portrait posture by a state sensor.

In one embodiment, the mobile terminal includes a finger scan sensor to sense a user's fingerprint, and wherein the controller, when a user input is sensed by the grip sensor after sensing user's fingerprint by the finger scan sensor, executes a lock function so that screen information displayed on the touch screen is not changed.

In one embodiment, the touch screen displays first visual information thereon, and wherein the controller, when the main body rotates while a user input is sensed by the grip sensor, divides the touch screen into a plurality of areas, executes a multi-window function in which different visual information is displayed on each area, and determines display area of the first visual information based on a rotation direction of the main body.

In one embodiment, the touch screen includes a first area and a second area, and wherein the controller displays the first visual information on the first area when the rotation direction of the main body is a first direction, and displays the first visual information on the second area when the rotation direction of the main body is a second direction.

In one embodiment, the controller displays the second visual information different from the first visual information on one area of the touch screen, when the multi-window function is executed, and wherein the second visual information is either icons in frequently used applications or an execution screen of a most recently executed application among the applications running on a background.

A method for controlling the mobile terminal equipped with a grip sensor to sense a user input applied to a side surface of a terminal body includes displaying at least one of a plurality of pieces of visual information stored in the memory on the touch screen, sensing a user input by the grip sensor while the editing mode to edit the plurality of pieces of visual information is executed, and executing the select-all function to set the displayed at least one visual information to be the editable-selected state based on the user input, wherein the select-all function does not set remaining visual information other than the displayed at least one visual information to the selected state.

In one embodiment, the displaying at least one visual information on the touch screen further includes displaying both the at least one visual information and new visual information based on a preset type touch input for the at least one visual information, and setting the at least one visual information and the new visual information to be all selected state upon sensing a user input by the grip sensor while the at least one visual information and the new visual information are displayed.

In one embodiment, the method further includes setting the selected state of the at least one visual information to a non-editable released state upon sensing a user input by the grip sensor while the at least one visual information is displayed.

In one embodiment, wherein the touch screen displays several items in list information, and, wherein the executing the select-all function includes executing the scroll function to scroll the list information based on the drag input applied on the touch screen while the several items are displayed on, and selecting the items displayed on the touch screen due to the execution of the scroll function, among the plurality of items in the list information, upon sensing a user input by the grip sensor after the execution of the scroll function.

In one embodiment, the method further includes executing the multi-window function in which different visual information is displayed on each area by dividing the touch screen into a plurality of areas when the main body rotates while a user input is sensed by the grip sensor and the first visual information is displayed on the touch screen, and displaying the first visual information on a specific area in the plurality of divided areas based on the rotation direction of the main body.

Advantageous Effects

A mobile terminal according to the present disclosure may improve user's convenience by responding to a user input sensed by a grip sensor during execution of an editing mode to edit a plurality of pieces of visual information displayed on a touch screen and executing a function related to the plurality of pieces of visual information.

In addition, the mobile terminal according to the present disclosure may improve user's convenience by controlling operation related to a state of the terminal in response to a user input sensed by the grip sensor.

BRIEF DESCRIPTION OF THE DRAWINGS

Referring to FIGS. 1A to 1C.

DETAILED DESCRIPTION OF THE EMBODIMENTS

Figure 1A:
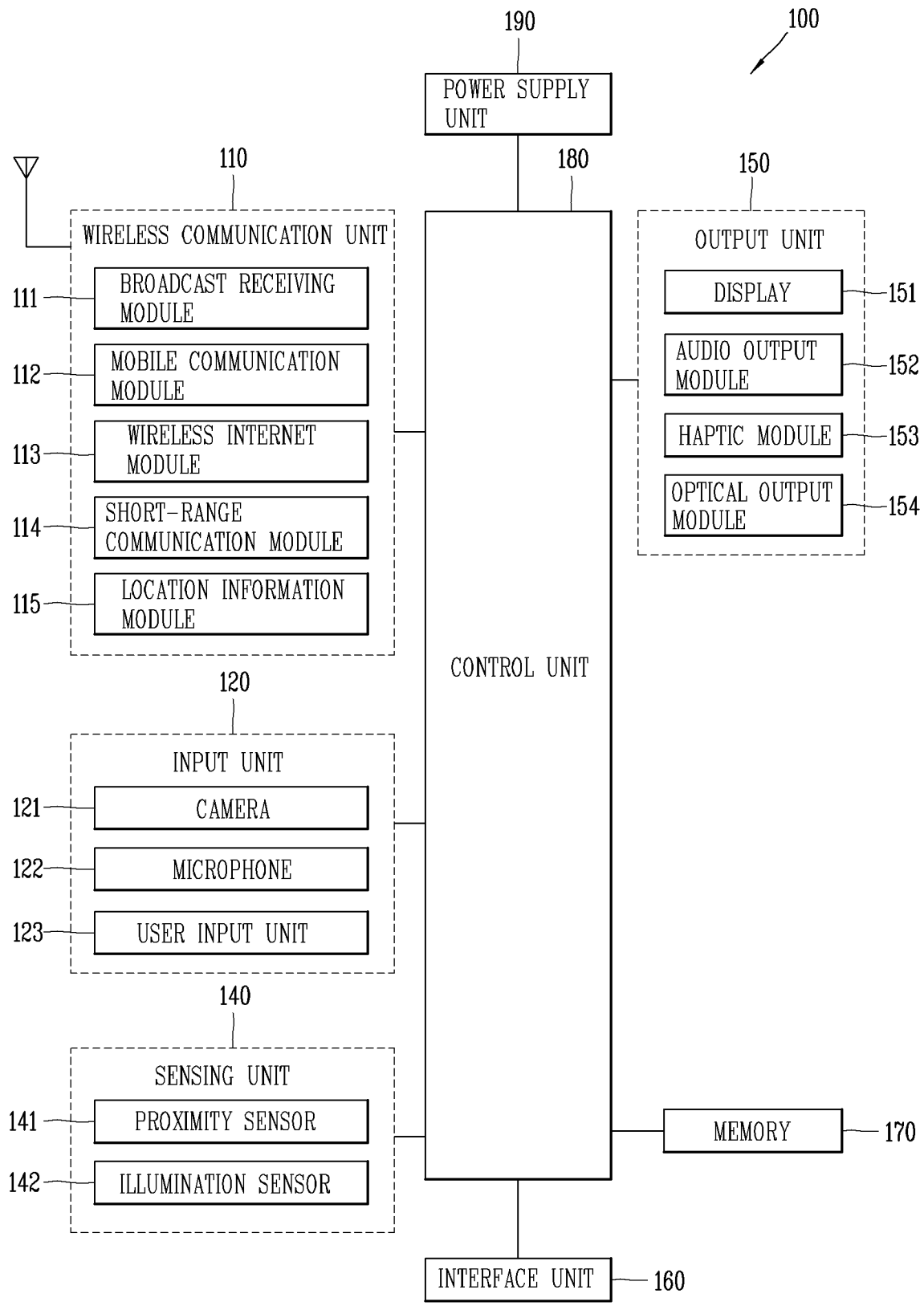
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
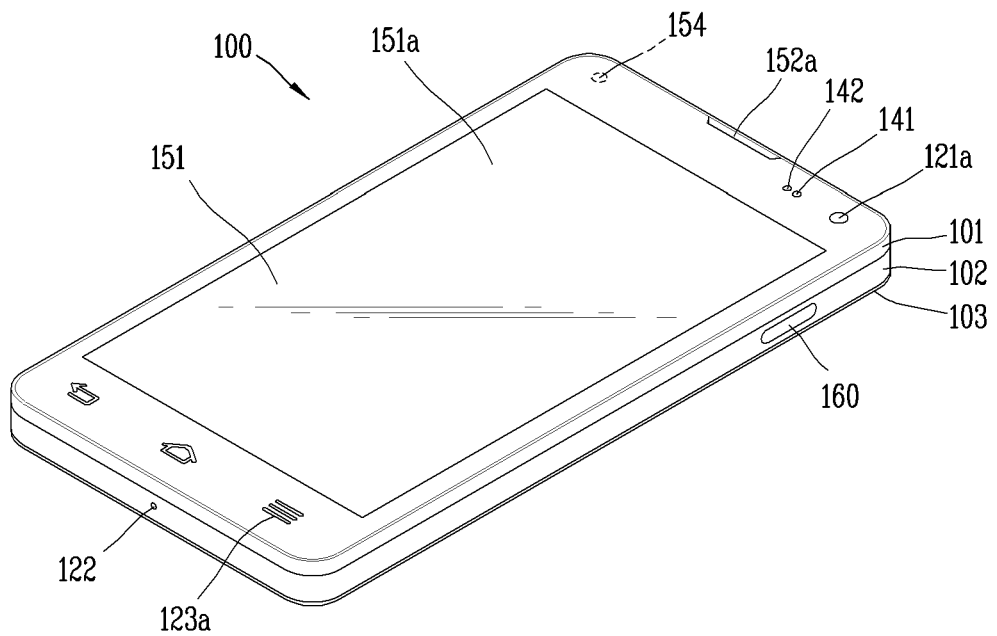
FIGS. 1B and 1C are conceptual views illustrating one example of a mobile terminal according to the present disclosure, viewed from different directions.
Figure 1C:
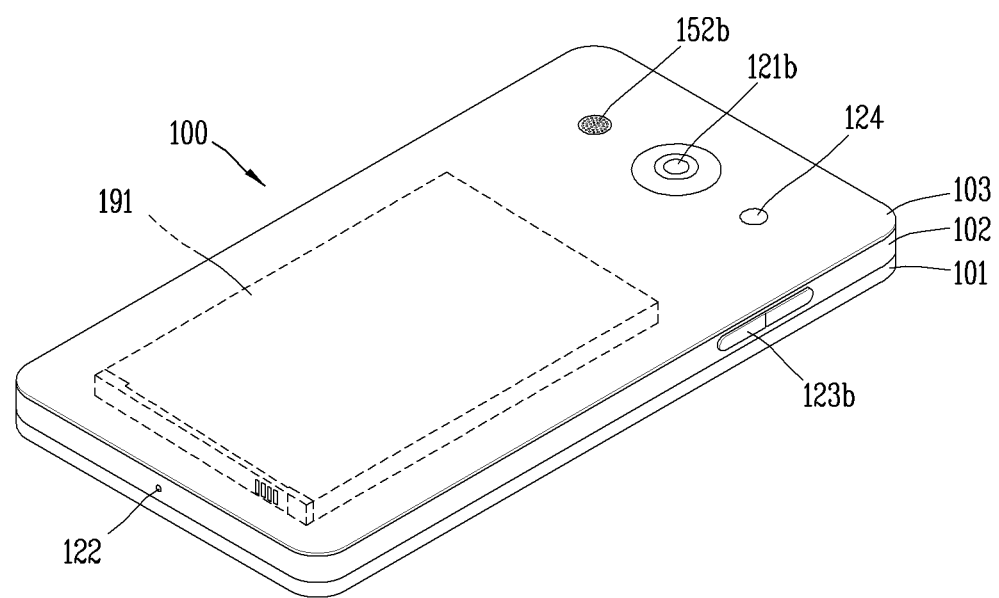

Referring to FIGS. 1A to 1C, FIG. 1A is a block diagram of a mobile terminal in accordance with one exemplary embodiment of the present disclosure, and FIGS. 1B and 1C are conceptual views illustrating one example of a mobile terminal, viewed from different directions.

The mobile terminal 100 may include a wireless communication unit 110, an input unit 120, a sensing unit 140, an output unit 150, an interface unit 160, a memory 170, a controller 180, a power supply unit 190, etc. It is understood that implementing all of the components illustrated in FIG. 1A is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiver 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, a red, green, and blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from two or more sensors of the sensing unit 140, and combinations thereof.

The output unit 150 may typically be configured to output various types of information, such as audio, video, tactile output, and the like. The output unit 150 may include at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless headset ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is implemented to store data to support various functions or features of the mobile terminal 100. For instance, the memory 170 may be configured to store application programs or applications executed in the mobile terminal 100, data or instructions for operations of the mobile terminal 100, and the like. At least one of these application programs may be downloaded from an external server via wireless communication. Other application programs may be installed within the mobile terminal 100 at time of manufacturing or shipping, which is the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiver 111 is configured to receive a broadcast signal and/or broadcast associated information from an external broadcast managing server via a broadcast channel. The broadcast channel may include a satellite channel, a terrestrial channel, or both. In some embodiments, two or more broadcast receivers may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The radio signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Next, the input unit 120 is for inputting image information (or signal), audio information (or signal), data, or information input from a user. For inputting image information, the mobile terminal 100 may be provided with a plurality of cameras 121. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function executed in the mobile terminal 100. The microphone 122 may include assorted noise removing algorithms to remove unwanted noise generated in the course of receiving the external audio signal.

The user input unit 123 is a component that receives an input of information from a user. Such user input may enable the controller 180 to control operation of the mobile terminal 100 in correspondence with the received information. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object existing near a surface, by using an electromagnetic field, infrared rays, or the like without a mechanical contact. The proximity sensor 141 may be arranged at an inner area of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor may sense a touch (or a touch input) applied to the touch screen, such as display 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which area of the display 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state to restrict a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming an appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display 151 is located on a front side of the terminal body to output information. As illustrated, a window 151a of the display 151 may be mounted in the front case 101 to form a front surface of the terminal body together with the front case 101.

In some embodiments, electronic components may also be mounted in the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted in the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, and 103 may be formed by injection-molding synthetic resin or may be formed of a metal, for example, stainless steel (STS), aluminum (Al), titanium (Ti), or the like.

As an alternative to the example in which the plurality of cases forms an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display 151, the first audio output module 152a, the proximity sensor 141, the illumination sensor 142, the optical output module 154, and the first camera 121a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

The display 151 may include at least one of a liquid crystal display (LCD), a thin film transistor-LCD (TFT LCD), an organic light-emitting diode (OLED), a flexible display, a three-dimensional (3D) display and an e-ink display.

The display 151 may be implemented using two display devices, according to the configuration type thereof. For instance, a plurality of the displays 151 may be arranged on one side, either spaced apart from each other, or these devices may be integrated, or these devices may be arranged on different surfaces.

The display 151 may include a touch sensor that senses a touch with respect to the display 151 so as to receive a control command in a touch manner. Accordingly, when a touch is applied to the display 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display 151 may include a sound hole for emitting sounds generated from the first audio output module 152a. However, the present disclosure is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured as a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display 151, or the like. The rear input unit may be implemented into a form allowing a touch input, a push input or a combination thereof.

The rear input unit may be disposed to overlap the display 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least some of functions of the first manipulation unit 123a located on the front surface of the terminal body. Accordingly, when the first manipulation unit 123a is not disposed on the front surface of the terminal body, the display 151 may be implemented to have a larger screen.

On the other hand, the mobile terminal 100 may include a finger scan sensor which scans a user's fingerprint. The controller 180 may use fingerprint information sensed by the finger scan sensor as an authentication means. The finger scan sensor may be installed in the display 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiver 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display 151 to extend the function of the mobile terminal 100. Another example of the accessory may be a touch pen for assisting or extending a touch input onto a touch screen.

Recently, a grip sensor is mounted on the mobile terminal so that a user can apply a user input by gripping the terminal. Hereinafter, referring to FIGS. 2A to 3C, a structure and an operation method of the grip sensor according to a grip sensing method will be described.

Figure 2A:
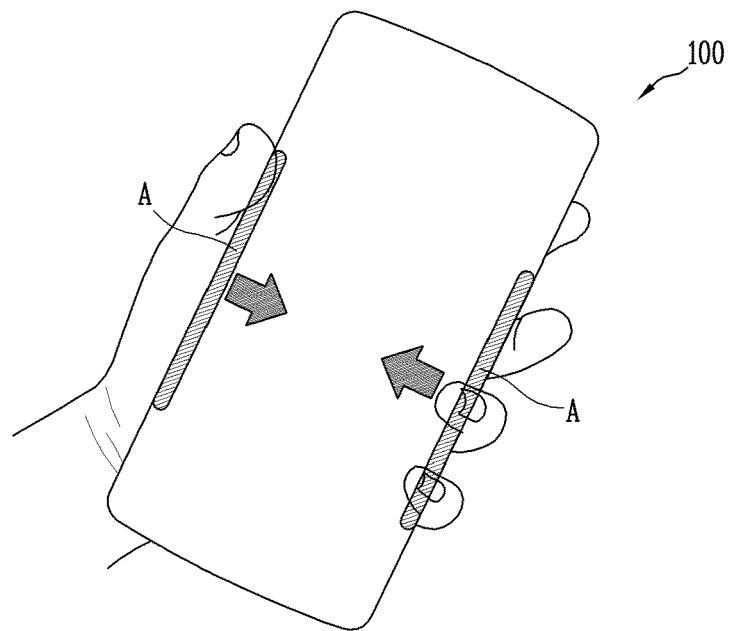
FIGS. 2A and 2B are conceptual views illustrating an implementation of a grip sensor mounted on the mobile terminal according to the present disclosure.
Figure 2B:
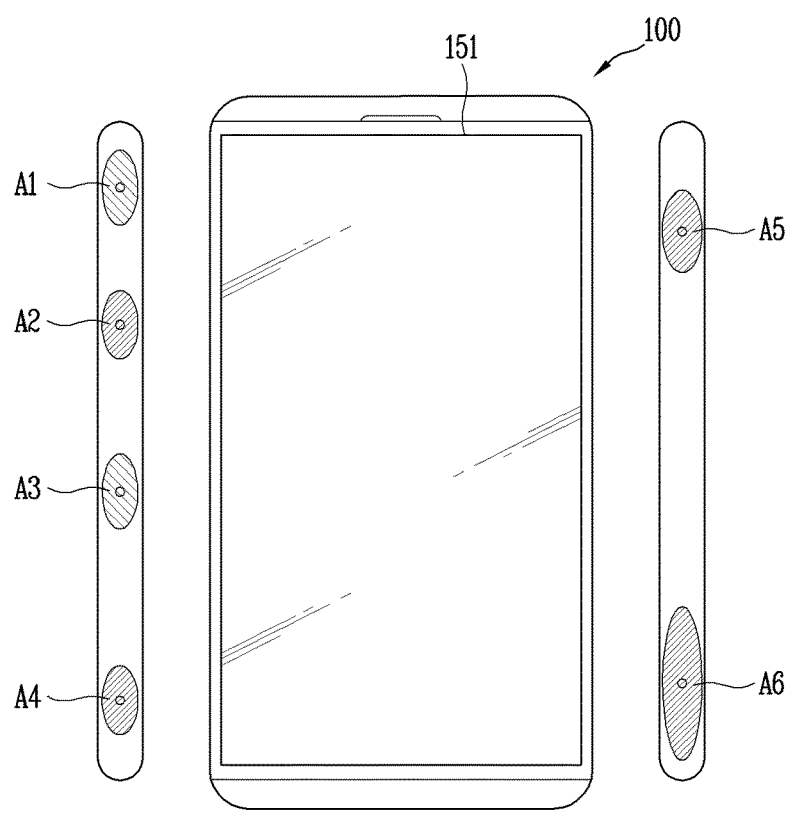

FIGS. 2A and 2B are conceptual views illustrating an implementation of the grip sensor mounted on the mobile terminal according to the present disclosure.

The grip sensor according to an embodiment of the present disclosure may be arranged on a side surface portion of a body of the mobile terminal. A plurality of areas A1, A2, A3, A4, A5, and A6 may be disposed respectively on the side surface portion of the terminal body, and a plurality of grip sensors may be disposed on the plurality of areas A.

Each grip sensor senses pressure applied to at least one of the plurality of areas, and the controller 180 executes a function corresponding to each area based on the pressure sensed by the respective grip sensor. Areas sensed by each of the grip sensor may be set differently, and a distance between the grip sensor may not be constant.

Figure 2C:
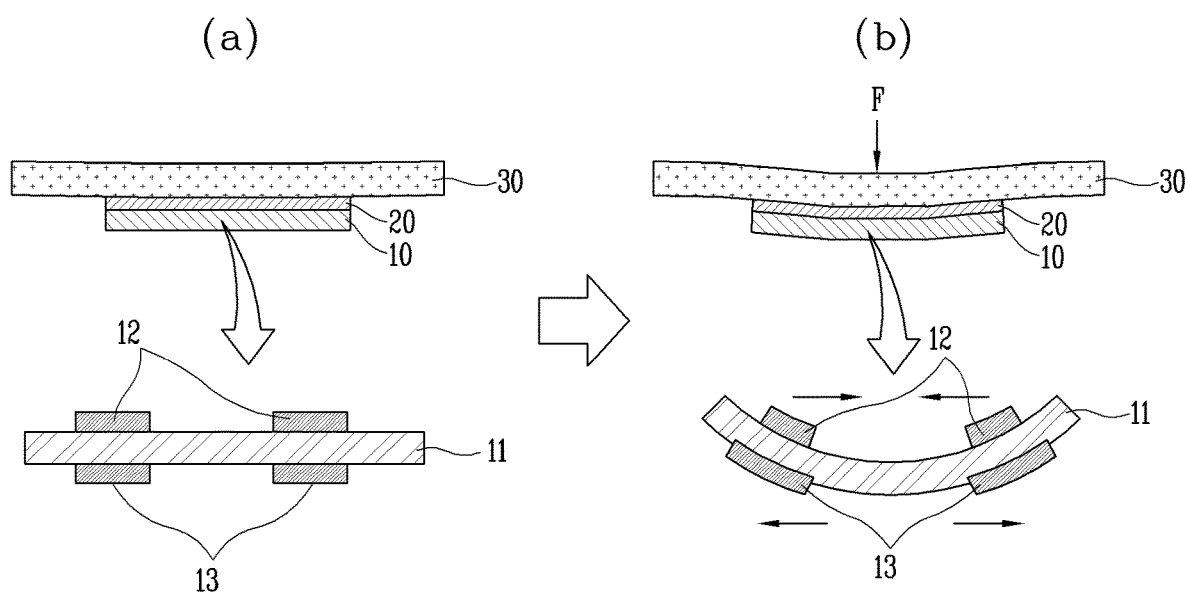
FIG. 2C is a conceptual view illustrating a grip sensor attached to a substrate.

FIG. 2C is a conceptual view illustrating a grip sensor attached to a substrate.

The mobile terminal 100 of the present disclosure includes a grip sensor 10 which is arranged on an area configuring a side surface of the main body of the front case 101 (see FIGS. 1A and 1B) defining an exterior and forming an inner space. The front case 101 may have a deformed structure, so that external force is well transmitted to the grip sensor 10.

The grip sensor 10 is attached to an inner surface of the front case 101, and the front case 101 is deformed while being pressed on an area by pressure applied to the side surface of the main body. Thus, when an area of the front case 101 is pressed, the grip sensor 10 is deformed to sense that pressure is applied by a change of a resistance value of a deformed member.

A substrate 30 of FIG. 2C may correspond to the front case 101 of an electronic device of the present disclosure. The grip sensor 10 is fixed on the substrate 30 by an adhesive member 20. The grip sensor 10 includes a base substrate 11, a first deformed member 12 and a second deformed member 13 respectively provided on both surfaces of the base substrate 11. In a case that the first and second deformed members 12, 13 are configured in plurality, the first and second deformed members 12, 13 may be disposed on the base substrate 11 to be spaced apart from each other.

When pressure F is applied on the substrate 30 to which the grip sensor 10 is attached, the substrate 30 is deformed. When the substrate 30 is deformed in a direction in which the pressure F is applied, the base substrate 11 is also bent in the same direction. The first and second deformed members 12, 13 provided on both surfaces of the base substrate 11 are deformed to be opposite to each other. The first deformed member 12 is contracted, since the first deformed member 12 is disposed on a concave surface of the deformed base substrate 11. And the second deformed member 13 is expanded, since the second deformed member 13 is disposed on a convex surface of the deformed base substrate 11. Accordingly, a resistance value of the first deformed member 12 of the grip sensor 10 decreases by the contraction, and a resistance value of the second deformed member 13 increases by the expansion. The controller 180 may obtain information on whether pressure is applied, a degree of the applied pressure, and a direction in which the pressure is applied, based on a change in an output value caused by a change in the resistance values of the first and second deformed members 12 and 13.

Figure 3A:
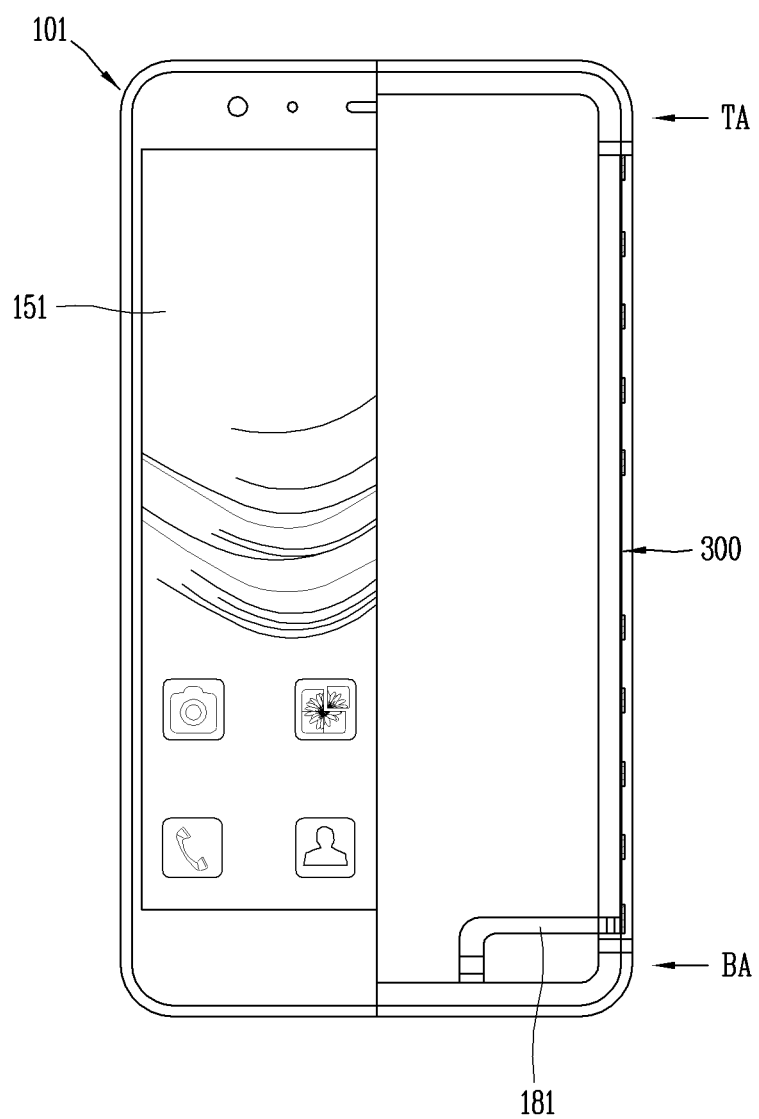
FIGS. 3A to 3C are conceptual views illustrating a grip sensor arranged at a side surface of a main body.
Figure 3B:
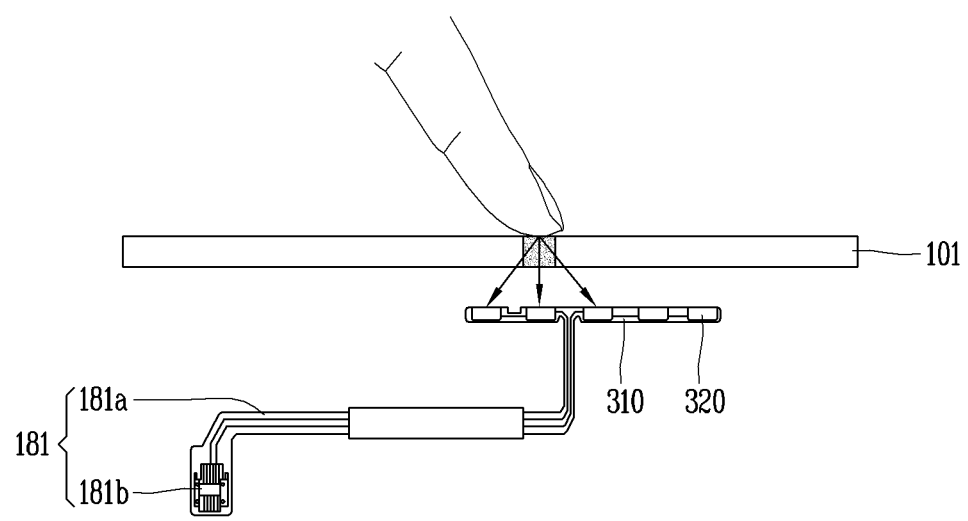
Figure 3C:
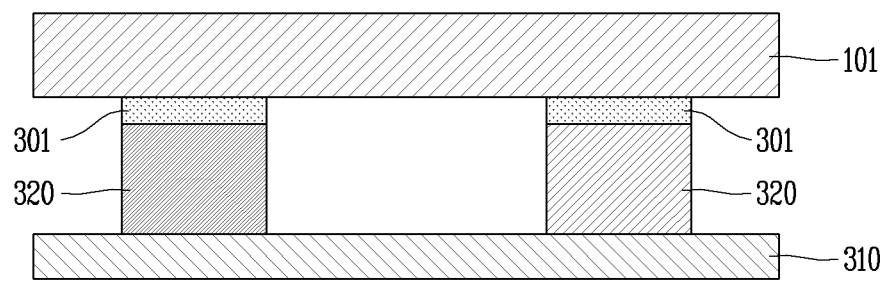

FIGS. 3A to 3C are conceptual views illustrating the grip sensor arranged at the side surface of the main body.

Referring to FIG. 3A, the grip sensor 300 is disposed on a side surface connecting an upper portion TA and a lower portion BA of the main body. The grip sensor 300 senses a touch input and pressure by a user's grip, and the controller 180 generates a control command based on a touch and/or pressure sensed by the grip sensor 300. Although not illustrated, the grip sensor 300 is provided on both side surfaces facing each other.

The grip sensor 300 extends in a lengthwise direction of the main body, and one end of the grip sensor 300 is electrically connected to a main circuit board by a flexible circuit board 181.

The grip sensor 300 is provided with a base 310 and a plurality of piezoelectric sensors 320. The base 310 may correspond to a flexible circuit board extending in one direction. The plurality of piezoelectric sensors 320 is disposed along the one direction. The flexible circuit board 181 includes an extending portion 181a extended from the base 310 and a connection pad portion 181b electrically connected to the main circuit board.

The plurality of piezoelectric sensors 320 is alternately implemented as a Tx part and an Rx part. Applying a high voltage alternative current of a high frequency to the piezoelectric sensor 320 (for example, about 700 KHZ, about 250 Ma), a vibration of the piezoelectric sensor 320 occurs. In addition, when pressure is applied to the piezoelectric sensor 320, an alternative current voltage is generated in proportion to the applied pressure. The controller 180 may sense a touch input by a change of a fine vibration pattern, and may sense pressure based on generation of an alternative current voltage.

When a finger is touched, the piezoelectric sensor of the Tx part outputs an ultrasonic pattern, and the piezoelectric sensor of the Rx part senses a change of the ultrasonic pattern. When a change in the ultrasonic pattern is sensed, it is determined that a touch input is applied. When the ultrasonic pattern is output, fine vibration occurs.

Referring to FIG. 3C, a plurality of piezoelectric sensors 310 is spaced apart from each other by a specific distance on the base 310. Adhesive members 301 are provided on the plurality of piezoelectric sensors 310 and attached to the inner surface of the front case 101 of the electronic device 100. Accordingly, the grip sensor 300 may sense a touch input and pressure caused by a grip of a user holding the front case 101.

The foregoing description has been given of the grip sensor to sense a user's grip on the mobile terminal according to the present disclosure. In the following, various embodiments that can be utilized for both the grip sensor by a pressure sensing and the grip sensor by an ultrasonic sensing will be described.

Figure 4A:
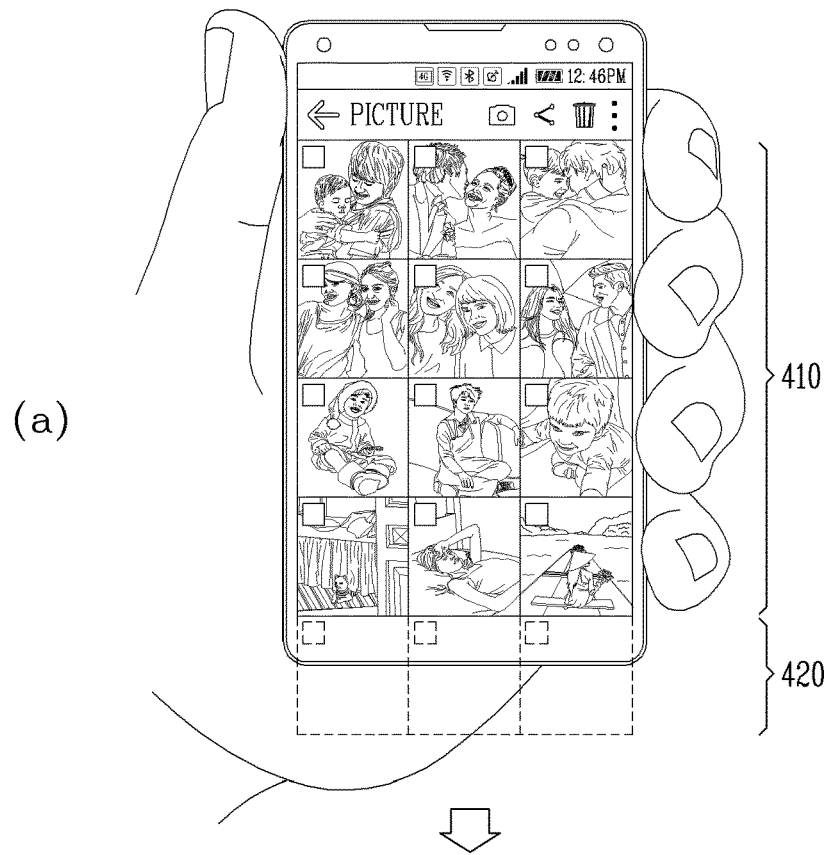
FIGS. 4A and 4B are conceptual views illustrating a method for selecting a plurality of pieces of image information at once while a gallery application is executed.
Figure 4A:
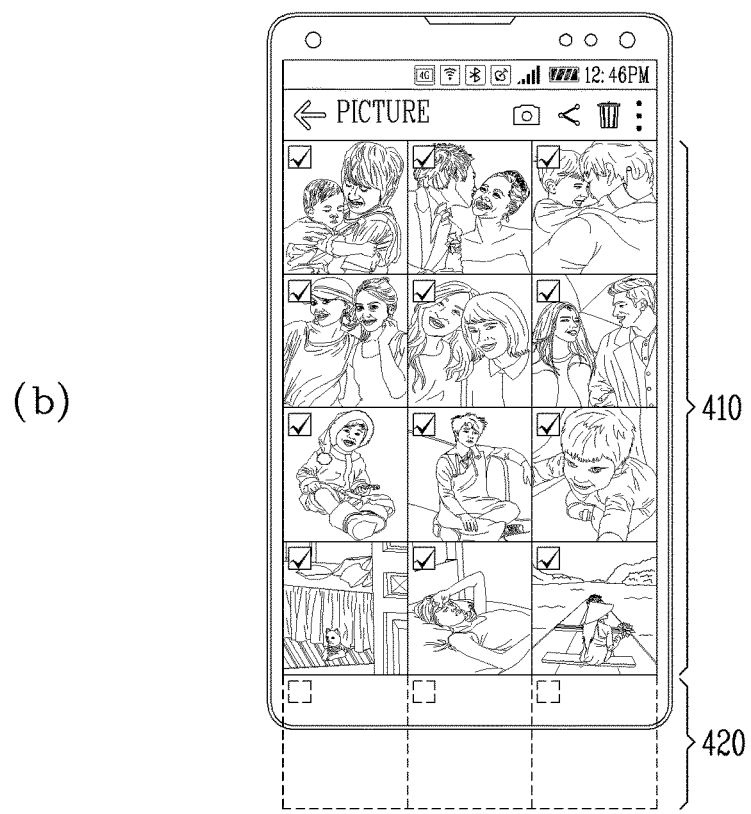
Figure 4B:
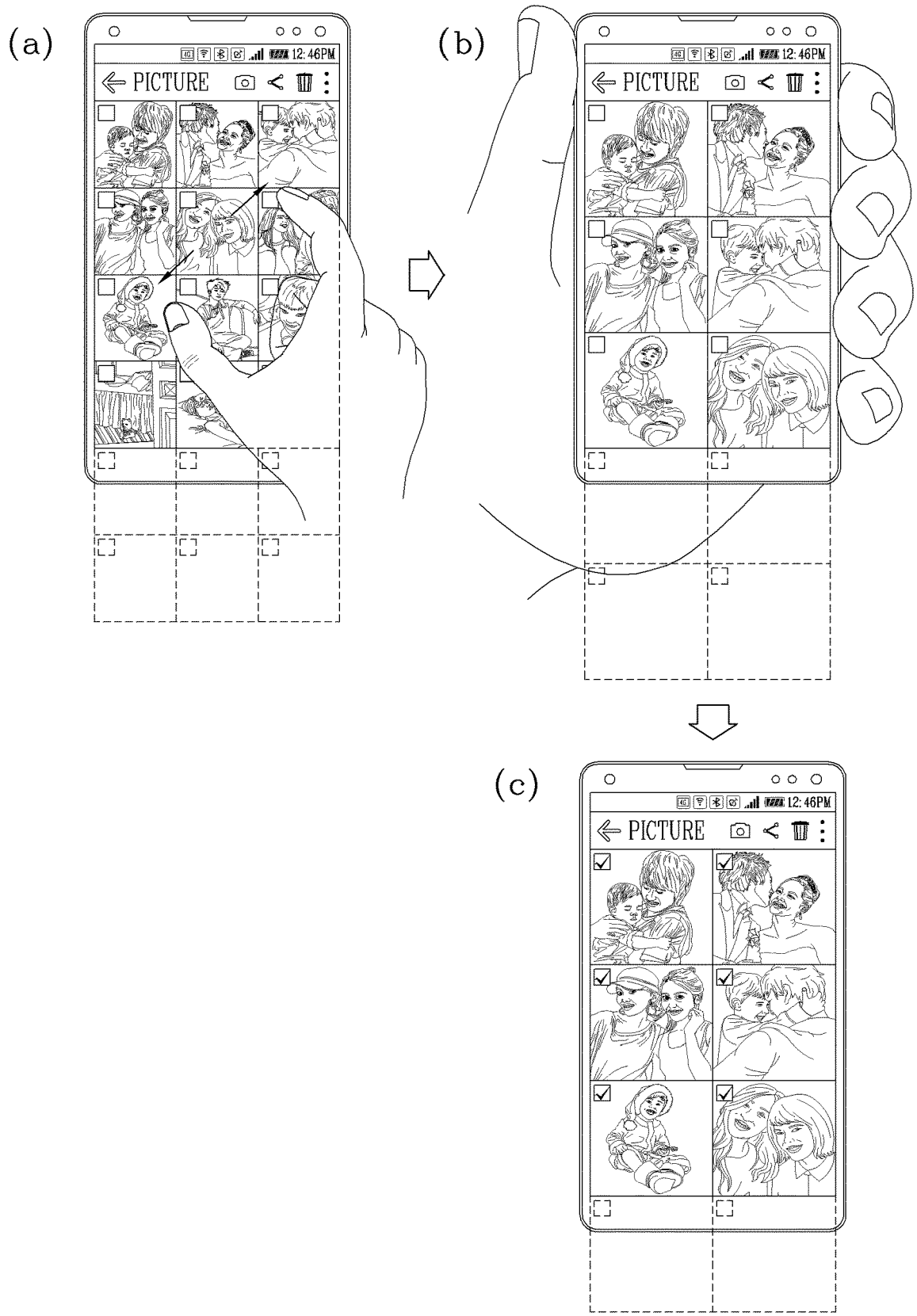
Figure 5A:
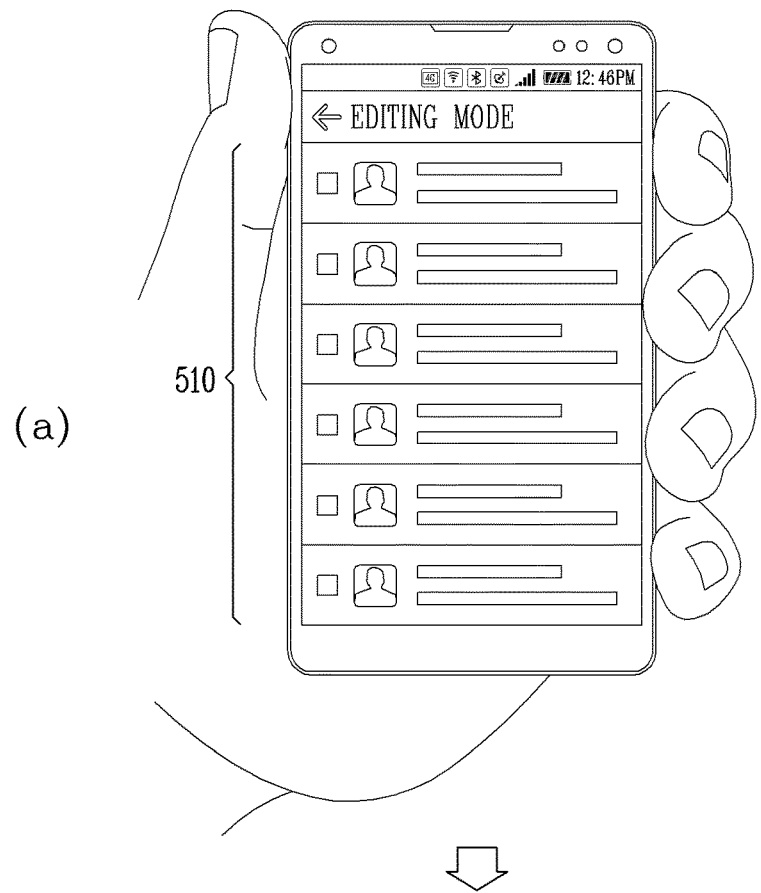
FIGS. 5A to 5C are conceptual views illustrating a method for controlling list information including a plurality of items by a grip input.
Figure 5A:
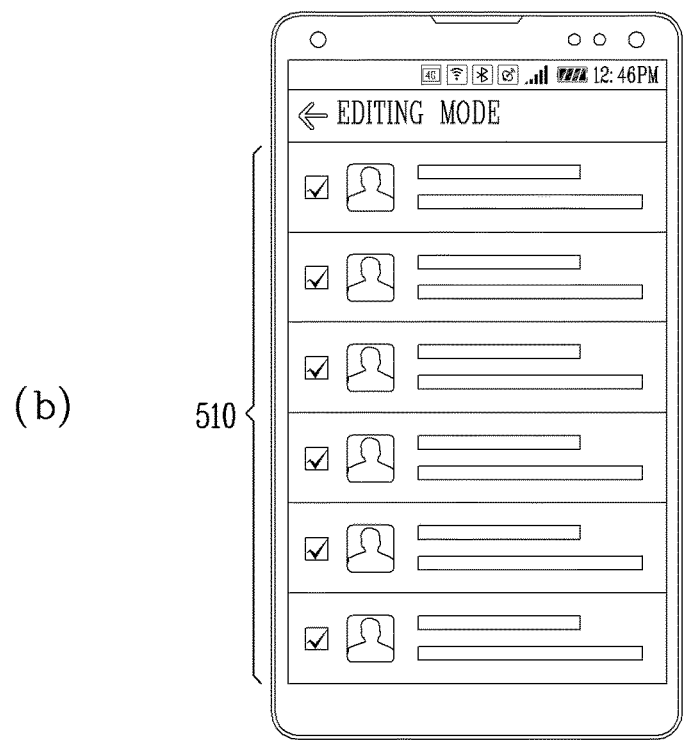
Figure 5B:
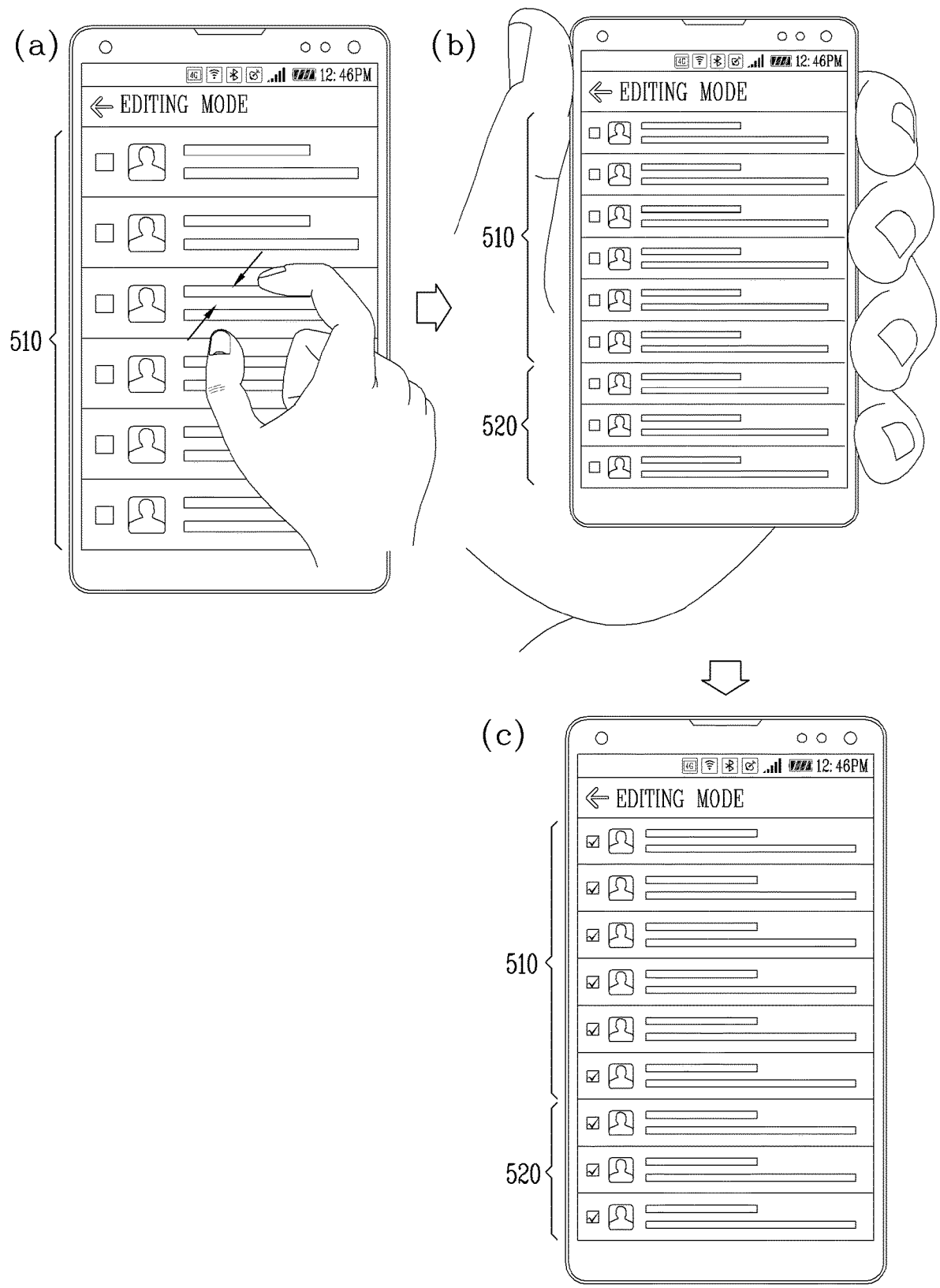
Figure 5C:
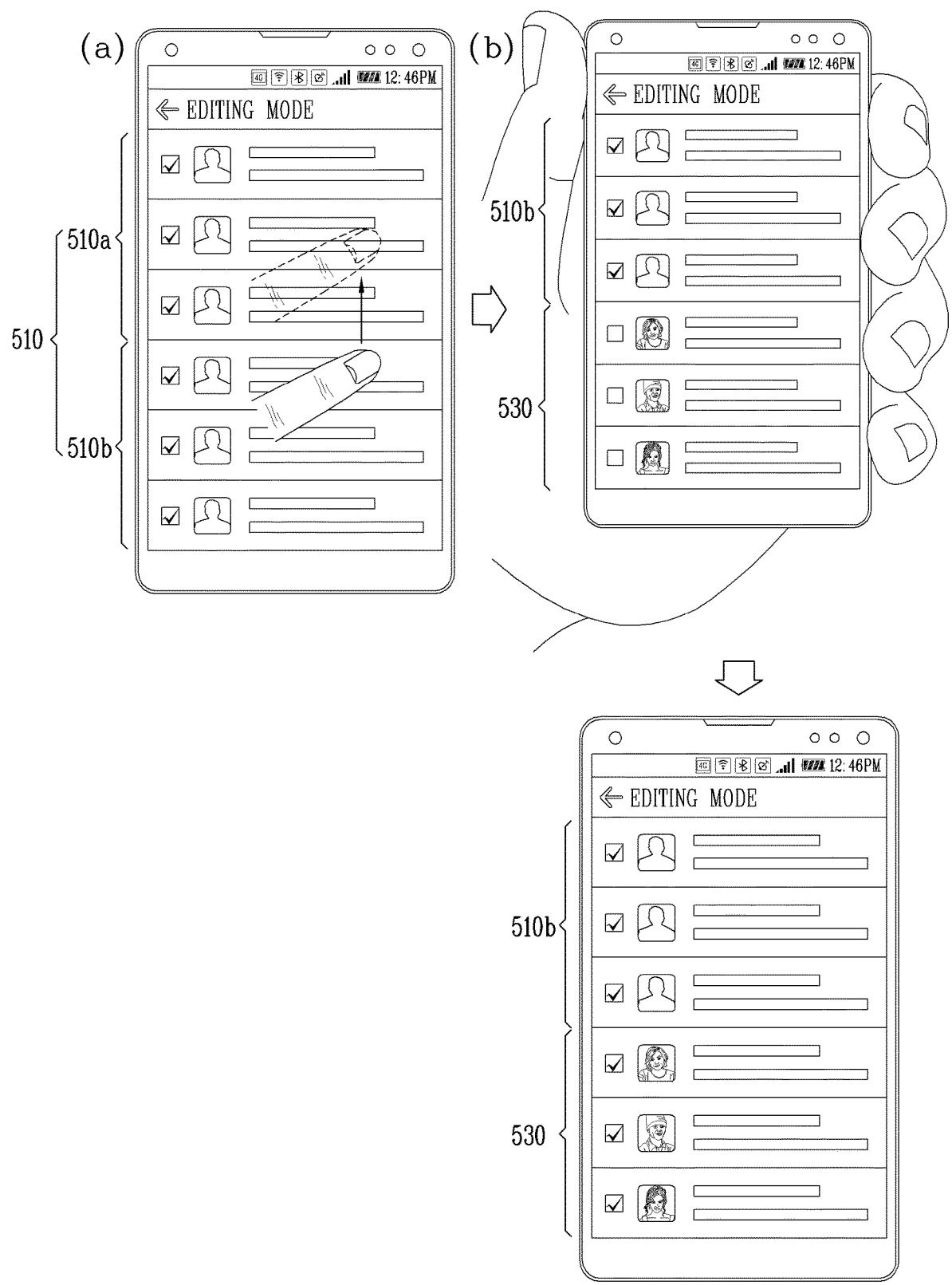

Hereinafter, a method for executing a function related to a plurality of pieces of visual information displayed on the touch screen by a user input sensed by the grip sensor will be described. FIGS. 4A and 4B are conceptual views illustrating a method for selecting a plurality of pieces of image information at once while a gallery application is executed. FIGS. 5A to 5C are conceptual views illustrating a method for controlling list information including a plurality of items by a grip input.

The controller 180 of the mobile terminal according to the present disclosure may sense a user input by the grip sensor. The user input sensed by the grip sensor may be generated by a user gripping the main body. The user input sensed by the grip sensor may be named in various terms such as a grip input or a grip command.

The controller 180 may generate different control commands based on at least one of a sensing position, a sensing area, a sensing time, a number of times of sensing, and a sensing pressure of a user input sensed by the grip sensor. For example, the controller 180 may generate different control commands according to a user input sensed at a first position and a user input sensed at a second position. As another example, the controller 180 may generate different control commands by dividing a user input sensed during a first time and a user input sensed during a second time.

In addition, the controller 180 may determine a posture of a user's hand currently holding the terminal, based on at least one of a sensing position and a sensing area of a user input sensed by the grip sensor. For example, the controller 180 may determine whether the user's hand is a right hand or a left hand, based on at least one of the sensing position and the sensing area of a user input sensed by the grip sensor.

The controller 180 may control an operation of the mobile terminal related to visual information displayed on the touch screen based on sensing a user input by the grip sensor. The visual information displayed on the touch screen may include all information that can be visually displayed, such as a still image, an icon, a widget, a message, and an email.

The operation of the mobile terminal may be an operation of executing a function related to visual information. Hereinafter, a method for executing a function related to visual information displayed on the touch screen based on a user input sensed by the grip sensor will be described. Functions related to the visual information may include a select-all function, a release-all function, a screen capture function, and the like. Hereinafter, a method for executing these functions will be described in more detail with reference to accompanying drawings.

First, when a plurality of images is displayed on the touch screen, the controller 180 may execute a function related to the plurality of images based on a user input sensed by the grip sensor.

For example, as illustrated in FIG. 4A, when the gallery application is executed, the controller 180 may output some images 410 of the images 410, 420 stored in the memory 170 on the touch screen. The gallery application is an application program that executes a function of outputting images stored in the memory 170 on the touch screen.

The some images 410 are images included in a specific folder in a plurality of folders accessible from the gallery application. The controller 180 may output by a predetermined number of images in some images included in the specific folder. A number of outputs of the images may be changed by a user input.

Meanwhile, the controller 180 may execute an editing mode to edit the some images 410 based on a user control command. In the editing mode, editing functions such as deleting information, moving a folder, copying, rotating, and making a GIF may be executed. The controller 180 may set an image selected by the user control command while the editing mode is executed to an editable-selected state. The controller 180 may execute an editing function on the selected image when a user input to execute the editing function for editing the image is applied while the image is set to the selected state. For example, the controller 180 may delete a first image when a user input for executing a delete function is applied while the first image is set to the selected state.

When the editing function is executed, the controller 180 may display a check box in an area adjacent to an area where the images are displayed to indicate that a plurality of images is editable.

On the other hand, the controller 180 may selectively edit only one image, but may also select a plurality of images at once and execute the editing function at once. To this end, a user of the related art mobile terminal had to apply a plurality of a user input in order to set the plurality of images to the selected state, respectively. Alternatively, when the select-all function was executed, a user of the mobile terminal selected all images at once included in a folder to which images being displayed on the touch screen belong. Therefore, the controller 180 could not conveniently select some images desired by the user.

Thus, the controller 180 of the mobile terminal according to the present disclosure may select some images at once based on a user input sensed by the grip sensor.

For example, as illustrated in (b) of FIG. 4A, the controller 180 may execute the select-all function in which images currently displayed on the touch screen 151 of the images 410, 420 included in a specific folder upon sensing a user input by the grip sensor. The controller 180 may not set the images 420 included in the specific folder but not displayed on the touch screen to the selected state. The select-all function may be understood as a function of setting only visual information currently displayed on the touch screen to the selected state. When the select-all function is executed, the controller 180 may display a checked mark on the check box displayed adjacent to the selected images 410.

Accordingly, the present disclosure does not need to apply an input for directly selecting respective images in order to edit all of the currently displayed images, thereby improving user's convenience. In addition, since only information in a currently visually identifiable state is set to the selected state and information in a non-visually identifiable state is not set to the selected state in the present disclosure, a user can recognize simultaneously selected information in advance before simultaneously selecting information.

The controller 180 may change a number of outputs of visual information currently displayed on the touch screen 151 based on a user input. For example, as illustrated in (a) of FIG. 4B, the controller 180 displays the number of outputs by a second number which is smaller than a first number based on a pinch-out input being applied while the images are displayed by the first number. In this case, as illustrated in (b) of FIG. 4B, the controller 180 may display visual information by the second number, and may display each image bigger in a size than when displaying the images by the first number.

In addition, although not illustrated, the controller 180 may increase the number of outputs by a third number which is greater than the first number based on the pinch-in input being applied while images are displayed by the first number. In this case, the controller 180 may display visual information by the third number, and may display each image smaller in the size than when displaying the images by the first number.

On the other hand, as illustrated in (b) and (c) of FIG. 4B, when a user input is sensed by the grip sensor while the images are displayed by the second number, the controller 180 may execute the select-all function that sets the second number of images to the selected state. Accordingly, the controller 180 may adjust the number of images selected at once by adjusting the number of images displayed on the touch screen.

Although not illustrated, the controller 180 may execute the release-all function that sets the plurality of images to a released state based on a user input sensed by the grip sensor while the plurality of images displayed on the touch screen 151 is set to the selected state. The released state is a state in which an image editing function is not applied.

Alternatively, although not illustrated, the controller 180 may execute the screen capture function when a user input is sensed by the grip sensor while visual information is displayed on the touch screen 151. The screen capture function is a function to capture visual information currently displayed on the touch screen 151 as an image, a GIF, or a video. Accordingly, the present disclosure may execute the screen capture function while securing a field of view for visual information to be screen captured.

The foregoing description has been given of the method for executing the select-all function according to a user input sensed by the grip sensor in the gallery application.

Hereinafter, a method for executing the select-all function when list information including a plurality of items is displayed on the touch screen will be described.

When a grip input is sensed while the list information including the plurality of items is displayed on the touch screen 151 and the editing mode is executed, the controller 180 may set the plurality of items to a select-all state.

The list information may be a message list, a mail list, a memo list, an SNS article list, a to-do list, and the like. For example, as illustrated in (a) of FIG. 5A, the message list including a plurality of messages 510 received from an external terminal may be displayed on the touch screen 151.

The controller 180 may execute the editing mode to edit the messages included in the message list 510 based on a user control command while the message list 510 is displayed. In the editing mode, a function of deleting, moving, and storing a message can be executed.

As illustrated in (a) of FIG. 5A, when the editing mode is executed, the controller 180 may display the check box for each message to indicate that the messages included in the message list are in an editable state.

As illustrated in (b) of FIG. 5A, the controller 180 may set the plurality of messages 510 displayed on the touch screen 151 to the selected state by responding to a user input being sensed by the grip sensor while the editing mode is executed. In addition, the controller 180 may not set messages that are not currently displayed on the touch screen 151 in the messages included in the message list to the selected state. Thus, users can intuitively and conveniently select information, since the information is visually shown.

The controller 180 may change a number of messages to be displayed on the touch screen based on a user control command. Therefore, users can directly set a number of selectable messages according to a user input sensed by the grip sensor.

As illustrated in (a) of FIG. 5B, the controller 180 may display messages by the second number which is greater than the first number on the touch screen 151 based on the pinch-in touch input being applied while the editing mode is executed and the first number of messages are displayed. The controller 180 may reduce a display size of each message in order to display the second number of messages on the touch screen 151.

In this case, as illustrated in (b) of FIG. 5B, the plurality of messages 510 displayed before the pinch-in touch input is applied and new messages 520 included in the message list not displayed before the pinch-in touch input is applied may be displayed together on the touch screen 151. In this state, as illustrated in (b) and (c) of FIG. 5B, the controller 180 may set the plurality of messages 510 and the new messages 520 to the select-all state based on a user input sensed by the grip sensor. Therefore, in the present disclosure, the select-all function may be conveniently executed not only for image information but also for message information.

Meanwhile, as illustrated in (a) of FIG. 5C, the controller 180 may execute the scroll function to scroll the message list based on a flicking touch input being applied in an up and down direction to the message list. The scroll function is a function of making at least some of the currently displayed information disappear on the touch screen, and outputting at least some of the information not currently displayed on the touch screen.

As illustrated in (b) of FIG. 5C, the controller 180 may display at least some messages 510a in the messages currently displayed 510 and new messages 530 based on the flicking touch input being applied in an up and down direction on the touch screen 151 while the editing mode is executed. In this state, when a user input is sensed by the grip sensor, the controller 180 may set at least some of the messages 510a and the new messages 530 currently displayed on the touch screen to the selected state.

In the above, a method for executing the select-all function to set a plurality of information to the selected state at once based on a user input sensed by the grip sensor has been described.

Figure 6A:
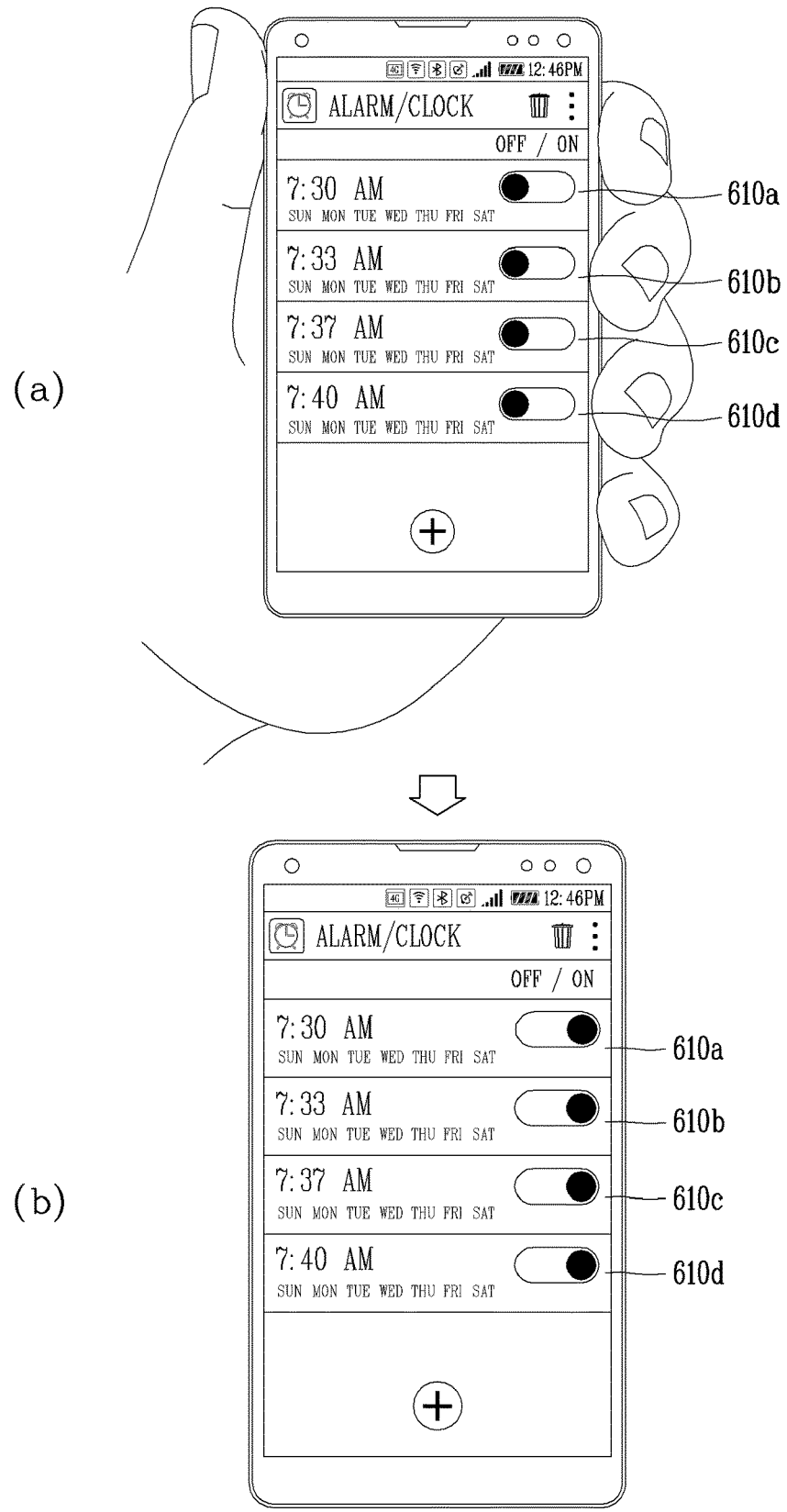
FIGS. 6A to 6C are conceptual views illustrating an embodiment to perform an operation of turning on and off a plurality of functions at once based on a user input sensed by a grip sensor.
Figure 6B:
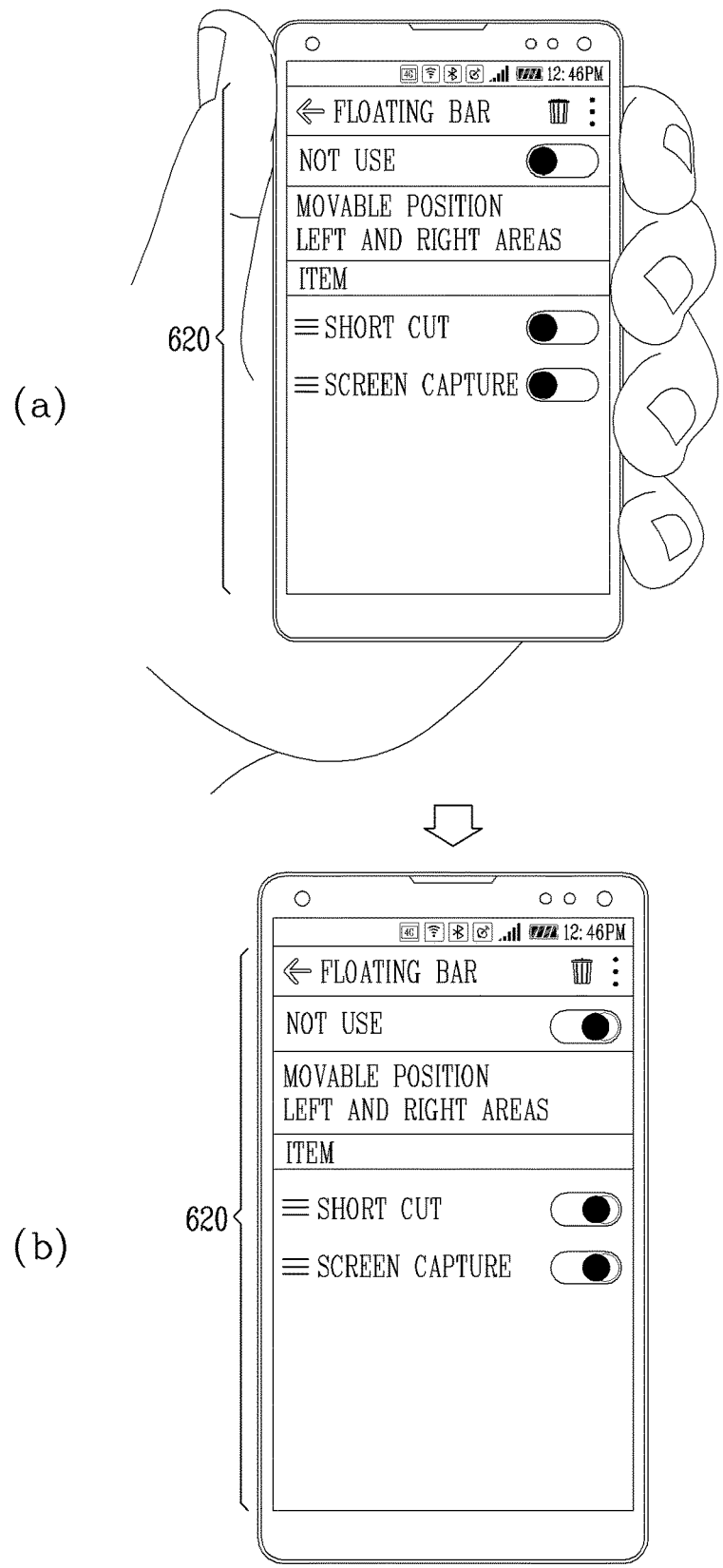
Figure 6C:
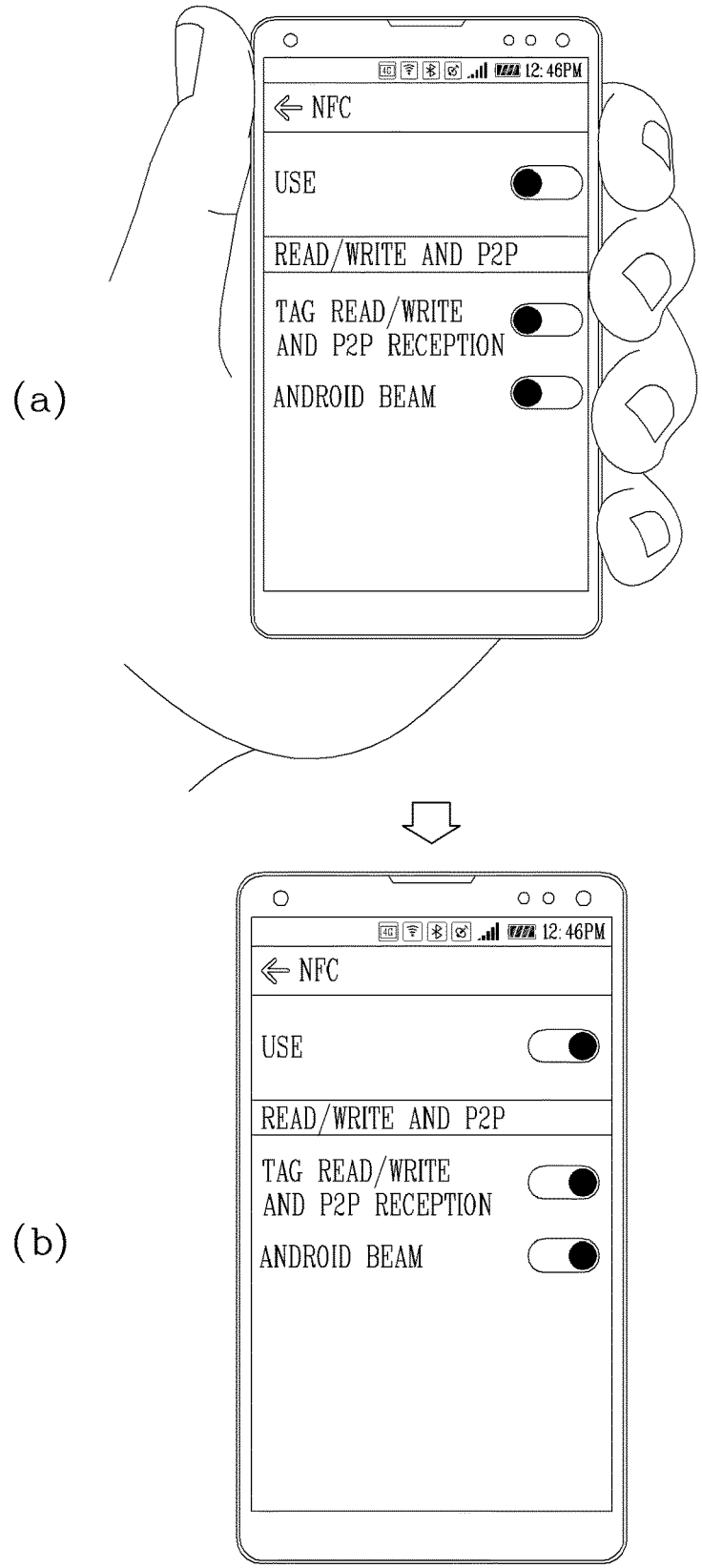

Hereinafter, an embodiment to perform an operation of turning on and off a plurality of functions at once based on a user input sensed by the grip sensor. FIGS. 6A to 6C are conceptual views illustrating an embodiment to perform an operation of turning on and off a plurality of functions at once based on a user input sensed by the grip sensor.

The controller 180 may output a plurality of icons associated with different functions on the touch screen 151. Functions associated with the plurality of icons are functions executed in a background and may be functions related to setting information of the mobile terminal. These functions may be executed in the background instead of an execution screen being immediately output when a touch input to an icon is applied. When a specific condition is satisfied, it may be set such that an execution screen of a corresponding function to be output or another function to be executed by using the corresponding function. For example, the functions associated with the plurality of icons may be a notification, a WIFI activation, a Bluetooth activation, a hotspot, an airplane mode, or the like.

Based on touch inputs to each of the plurality of icons, the controller 180 may activate (On) or deactivate (Off) a function associated with the corresponding icon.

Meanwhile, the controller 180 may simultaneously activate or deactivate a function associated with the plurality of icons based on a user input sensed by the grip sensor.

For example, as illustrated in (a) and (b) of FIG. 6A, when a plurality of icons 610a, 610b, 610c, and 610d respectively associated with functions set to output a notification signal at different time zones is displayed, and when the functions set to output the notification signal at different times are in an inactive state, the controller 180 may activate all of the functions outputting the notification signal at different time zones based on a user input sensed by the grip sensor.

In addition, although not illustrated, when the plurality of icons 610a, 610b, 610c, and 610d respectively associated with functions set to output the notification signal at different time zones is displayed, and when the functions set to output the notification signal at different times are in an active state, the controller 180 may deactivate all of the functions outputting the notification signal at different time zones based on a user input sensed by the grip sensor. Therefore, users can control activation and deactivation of the notification information even without applying a separate touch input for each notification time zone.

In addition, when a user input is sensed by the grip sensor while screen information to control a setting value of the mobile terminal is displayed, the controller 180 may simultaneously activate or deactivate the setting value of the mobile terminal. For example, referring to (a) and (b) of FIG. 6B, when a user input is sensed by the grip sensor while screen information 620 related to a setting of a floating bar is displayed, the controller 180 may activate all the functions (shortcut, screen capture, etc.) related to the floating bar. Here, the floating bar is a bar-shaped graphic object that is displayed on one area of the touch screen and includes shortcut icons for functions set by a user.

In addition, when a user input is sensed by the grip sensor while icons indicating a plurality of setting functions related to NFC is displayed, the controller 180 may activate or deactivate all of the plurality of setting functions related to NFC. For example, as illustrated in (a) and (b) of FIG. 6C, when a user input is sensed by the grip sensor while icons representing an NFC reading mode function and an NFC communication function are displayed, both the NFC reading mode function and the NFC communication function can be activated.

The foregoing description has been given of the method for simultaneously activating or deactivating the functions related to the setting of the mobile terminal using a user input sensed by the grip sensor.

Figure 7A:
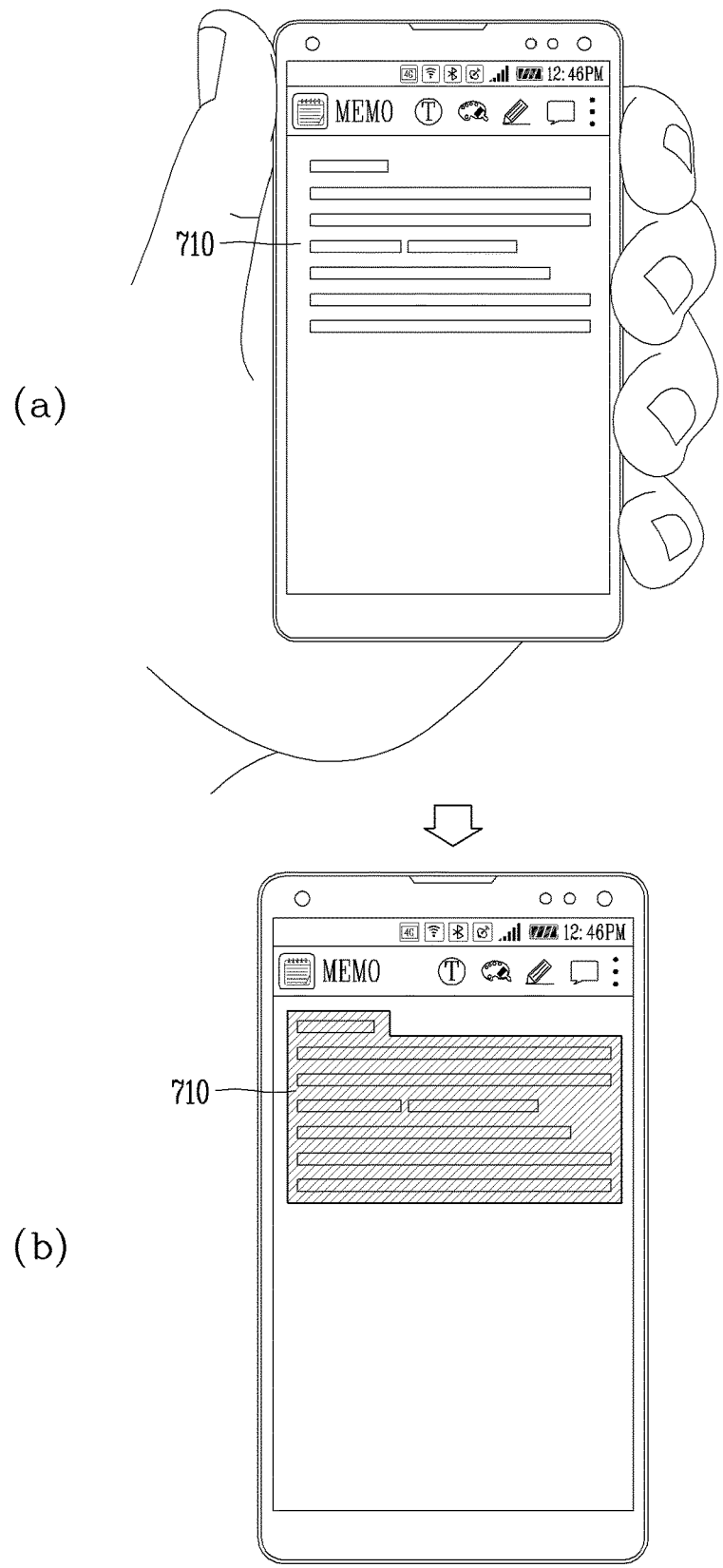
FIGS. 7A and 7B are conceptual views illustrating a method for selecting all pieces of text information by a user input sensed by a grip sensor.
Figure 7B:
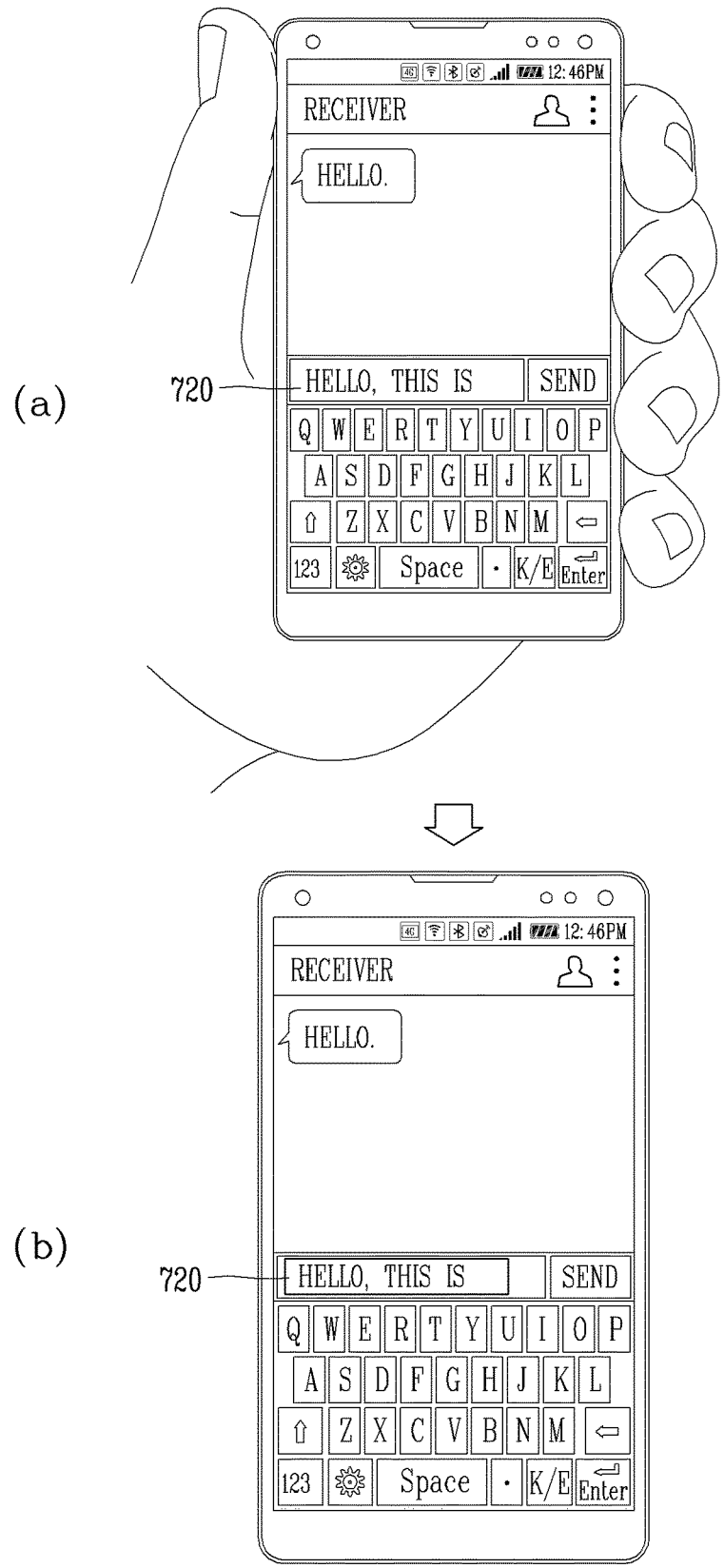

Hereinafter, a method for selecting all pieces of text information by a user input sensed by the grip sensor will be described. FIGS. 7A and 7B are conceptual views illustrating a method for selecting all pieces of text information by a user input sensed by the grip sensor.

The controller 180 may control the touch screen 151 to display text information on the touch screen 151. The text information may be memo information, text information, message information, and the like.

When a user input is sensed by the grip sensor while the text information is displayed on the touch screen 151, the controller 180 may set the displayed text information to the selected state. In this case, unlike the foregoing description, the editing mode may not be executed in the mobile terminal.

For example, as illustrated in (a) of FIG. 7A, the controller 180 may execute a memo application that provides functions of inputting, editing, and storing memo information. In this case, an execution screen of the memo application may be displayed on the touch screen 151. The execution screen of the memo application may include pre-input memo information and icons to edit the memo information.

As illustrated in (b) of FIG. 7A, when a user input is sensed by the grip sensor while the pre-input memo information is displayed on the touch screen 151, the controller 180 may set the pre-input memo information to the selected state. In this case, the controller 180 may change a form of output of the pre-input memo information to indicate that the pre-input memo information is set to the selected state. The form of output may include an output color, an output size, an output contrast, and the like. For example, when the pre-input memo information is set to the selected state, the controller 180 may change the output color of the pre-input memo information.

Meanwhile, when an input window to input text information is displayed on the touch screen 151, the controller 180 may set only the text information input to the input window to the selected state in response to sensing a user input by the grip sensor. For example, as illustrated in (a) of FIG. 7B, messages transmitted to and received from an external device and an input window 720 to input a message may be displayed on the touch screen 151. In this case, the text information may be information transmitted and received and information input in the input window.

As illustrated in (b) of FIG. 7B, the controller 180 may detect text information input to the input window based on a user input sensed by the grip sensor, and may set only the detected text information to the selected state. In this case, the transmitted and received messages may not be set to the selected state. Therefore, users may selectively select only text information input in the input window.

The foregoing description has been given of the method for executing a function related to visual information displayed on the touch screen based on a user input sensed by the grip sensor.

Hereinafter, a method for executing a function related to state information of the mobile terminal based on a user input sensed by the grip sensor will be described. FIGS. 8A to 10B are conceptual views illustrating a method for executing a function related to state information of the mobile terminal based on a user input sensed by the grip sensor.

The mobile terminal according to the present disclosure may further include sensors to detect state information related to a state of the mobile terminal. The sensors to detect state information may include the proximity sensor 141 (see FIG. 1B), a gyro sensor, the illumination sensor 142 (see FIG. 1B), the acceleration sensor, the finger scan sensor, and the like. Detailed description of the sensors is replaced with the description of FIG. 1A.

The controller 180 may generate state information of the mobile terminal based on sensing information received from at least one sensor among the plurality of sensors. For example, as illustrated in (a) of FIG. 8A, the mobile terminal may have a state in which the touch screen faces down. That is, the mobile terminal may be in a state in which the touch screen is turned over to be brought into contact with an upper surface of a table. Hereinafter, for the sake of explanation, a state in which the touch screen faces down is referred to as a state in which the touch screen is turned over.

The controller 180 may determine the turned over state based on sensing information received from the proximity sensor 141 and the gyro sensor. For example, the controller 180 may receive sensing information indicating that an object exists adjacent to the touch screen from the proximity sensor 141 and receive sensing information indicating that the terminal body is in a horizontal state from the gyro sensor. The controller 180 may determine that the mobile terminal is turned over by using the sensing information sensed by the proximity sensor 141 and the sensing information sensed by the gyro sensor.

The controller 180 may control different functions according to whether a specific function is executed in the mobile terminal upon sensing a user input by the grip sensor while the terminal is turned over.

First, the controller 180 may execute a specific function in the turned over state. In this case, the controller 180 may stop the execution of the specific function based on a user input sensed by the grip sensor while the specific function is executed in the turned over state. The specific function may be a call function, a music play function, or the like.

Figure 8A:
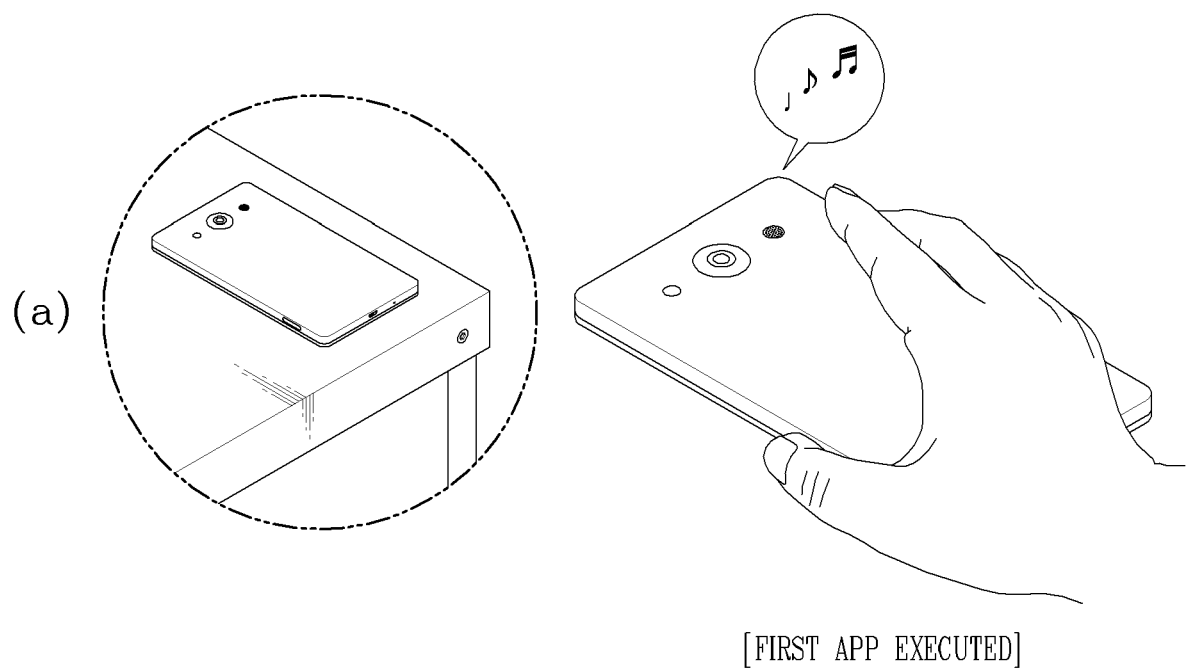
FIGS. 8A to 10B are conceptual views illustrating a method for executing a function related to state information of a mobile terminal based on a user input sensed by a grip sensor.
Figure 8A:
Figure 8A:
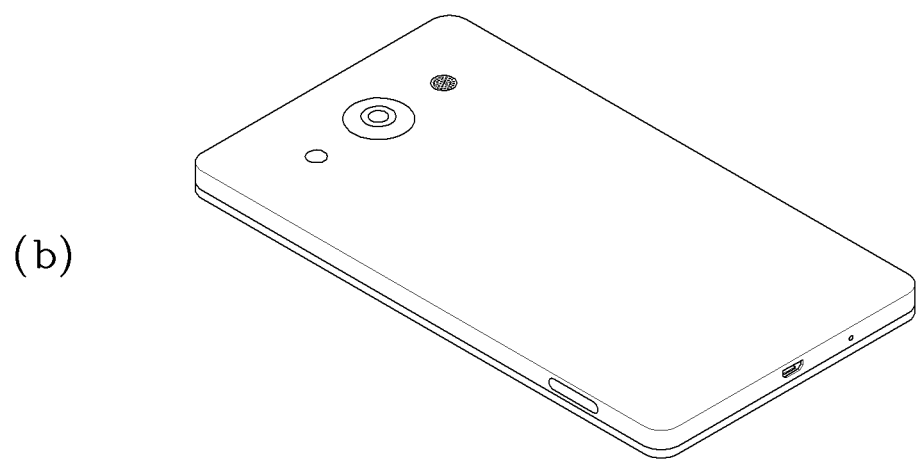

For example, as illustrated in (a) of FIG. 8A, the controller 180 may execute the music play function in the turned over state. At this time, as illustrated in (b) of FIG. 8A, the controller 180 may stop the music play function based on a user input sensed by the grip sensor while the music play function is executed in the turned over state.

In addition, although not illustrated, while notification information indicating a reception of a call signal is output in the turned over state, the controller 180 may stop an output of the notification information based on a user input sensed by the grip sensor.

Alternatively, although not illustrated, while notification information indicating a reception of a call signal is output, the controller 180 may stop the reception of the call signal based on a user input sensed by the grip sensor. That is, a call rejection function may be executed.

Figure 8B:
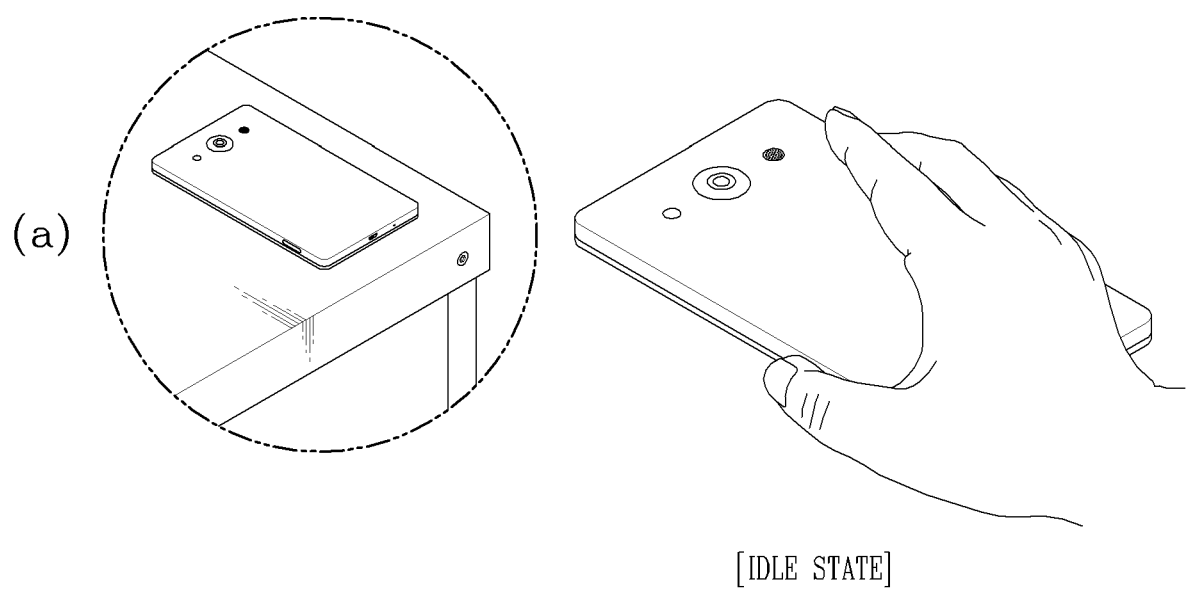
Figure 8B:
Figure 8B:
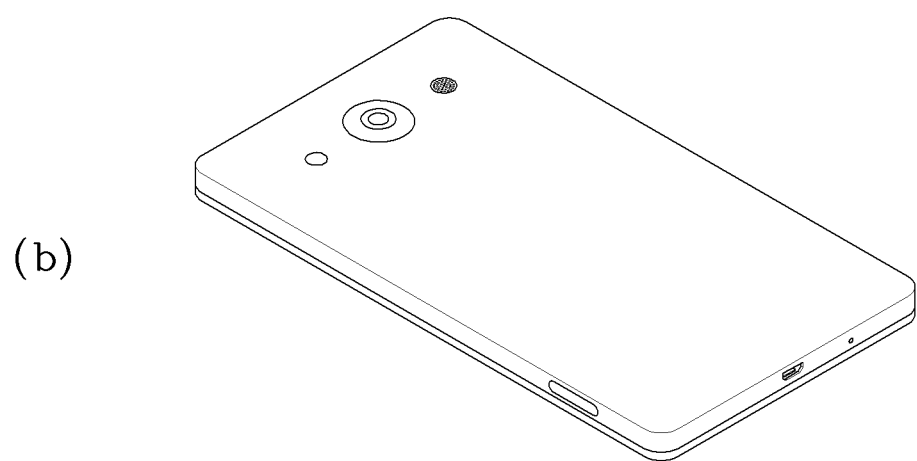

Alternatively, as illustrated in (a) of FIG. 8B, the mobile terminal may be an idle mode while in the turned over state. The idle mode may indicate a state in which functions installed on the mobile terminal are not executed. In this case, as illustrated in (b) of FIG. 8B, the controller 180 may execute a silent mode in which notification information is not output based on a user input sensed by the grip sensor. The silent mode is a function to set notification information notifying an occurrence of a specific event, such as a call signal notification and a message reception notification not at all to be output, or to be output only in a visual manner or a tactile manner. In addition, the silent mode is a mode in which a brightness of the touch screen is set to a minimum.

That is, the mobile terminal according to the present disclosure may conveniently control an operation of the mobile terminal, wherein the operation is related to either state information of the mobile terminal or a function currently executed, by responding to a user input sensed by the grip sensor in the turned over state while a field of view of the touch screen is not secured. Therefore, a user can perform operation control suitable for current situation without checking visual information displayed on the terminal.

Figure 9A:
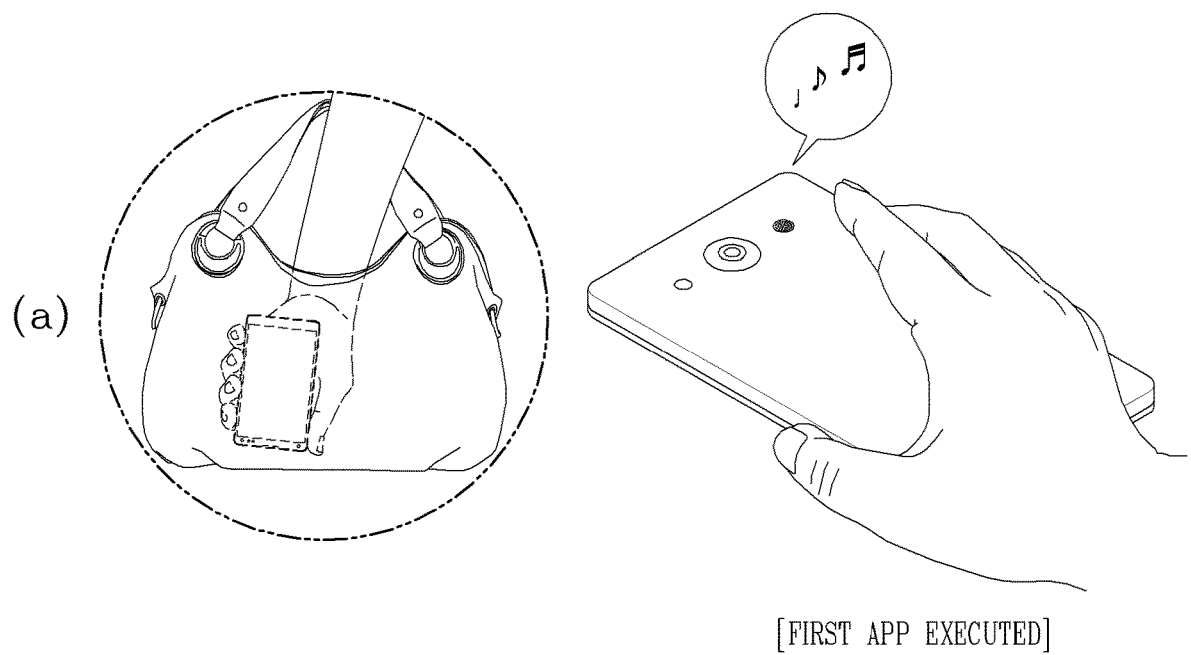
Figure 9A:
Figure 9A:
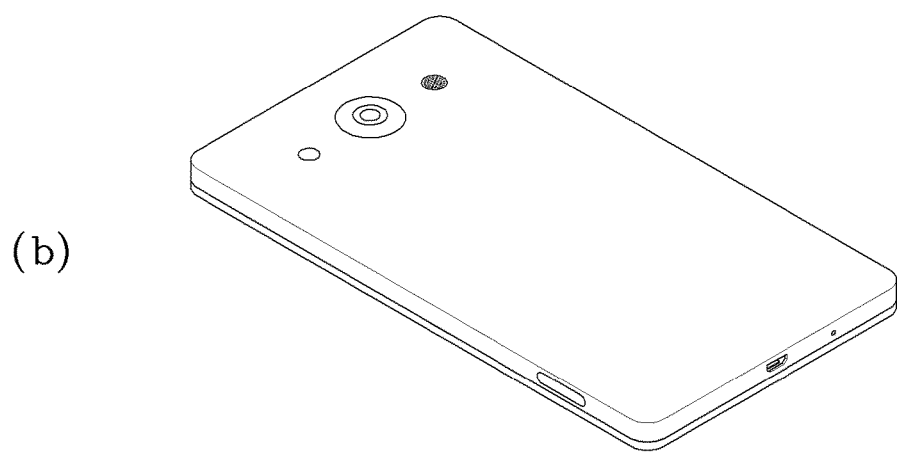

In addition, as illustrated in (a) of FIG. 9A, the controller 180 may sense that the mobile terminal is located inside a bag based on sensing information received from at least one sensor among a plurality of sensors. In detail, the controller 180 may receive sensing information indicating that an object exists around the touch screen from the proximity sensor, sensing information indicating that the main body is in a state being crooked from the gyro sensor, and illumination information indicating an illumination around the touch screen from the illumination sensor. Also, the controller 180 may sense that the mobile terminal is located inside the bag by using the sensing information sensed from the proximity sensor, the sensing information sensed from the gyro sensor, and the illumination information sensed from the illumination sensor. For example, the controller 180 may determine that the mobile terminal is located inside the bag when an object exists around the touch screen, the terminal body is currently crooked, and illumination around the terminal is at a reference value or less. Hereinafter, for convenience of explanation, a state in which the mobile terminal is located inside the bag will be described as a state inside the bag.

The controller 180 may execute different functions according to whether a specific function is executed in the mobile terminal when a user input is sensed by the grip sensor in the state inside the bag.

For example, the controller 180 may stop the execution of the specific function when a user input is sensed by the grip sensor while the specific function is executed in the state inside the bag. For example, as illustrated in (a) and (b) of FIG. 9A, when a user input is sensed by the grip sensor while the music play function is executed in the state inside the bag, the controller 180 may stop the execution of the music play function.

Figure 9B:
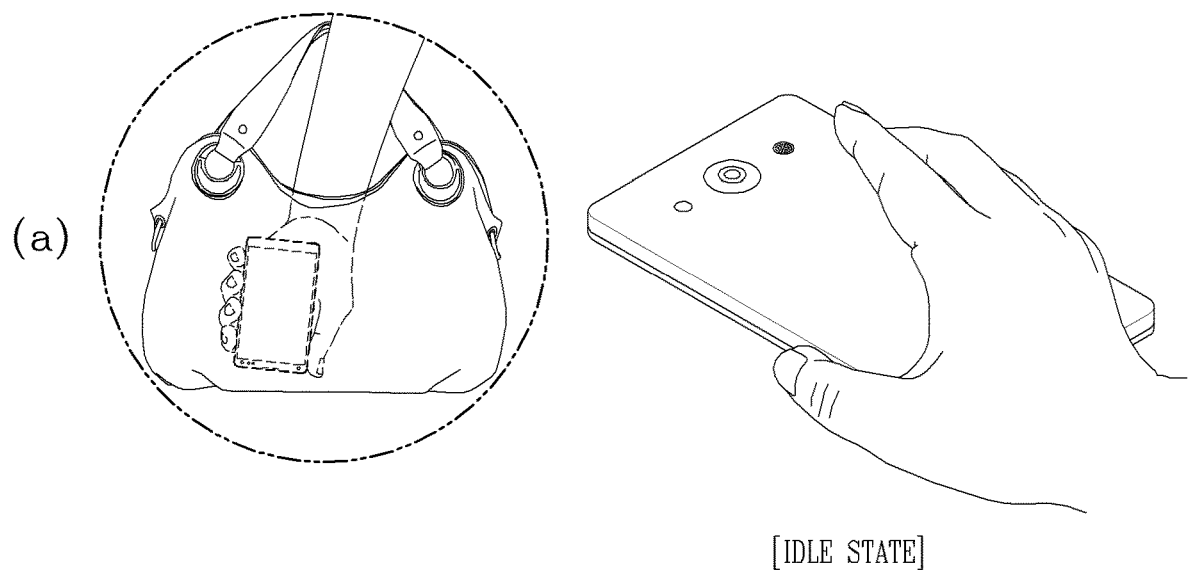
Figure 9B:
Figure 9B:
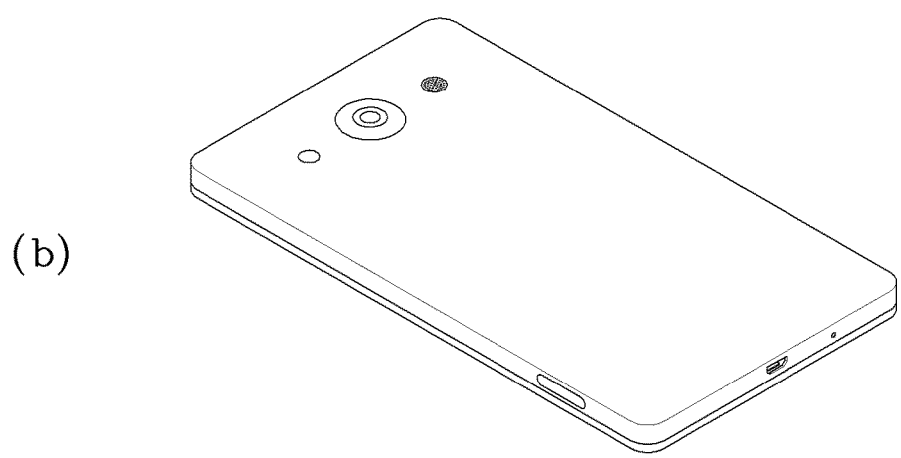

As another example, as illustrated in (a) and (b) of FIG. 9B, the controller 180 may execute the silent mode function when a user input is sensed by the grip sensor while the idle mode is executed in the state inside the bag. Accordingly, the user can conveniently control the operation of the terminal without taking the terminal out of the bag even when the terminal is inside the bag and a field of view of the visual information displayed on the touch screen is not secured.

In addition, the controller 180 may temporarily execute a landscape view mode when a user input is sensed by the grip sensor within a preset time after the posture of the main body is changed.

Here, the landscape view mode indicates a display direction of visual information displayed on the touch screen. Hereinafter, the landscape view mode and a portrait view mode will be described in more detail.

Figure 10A:
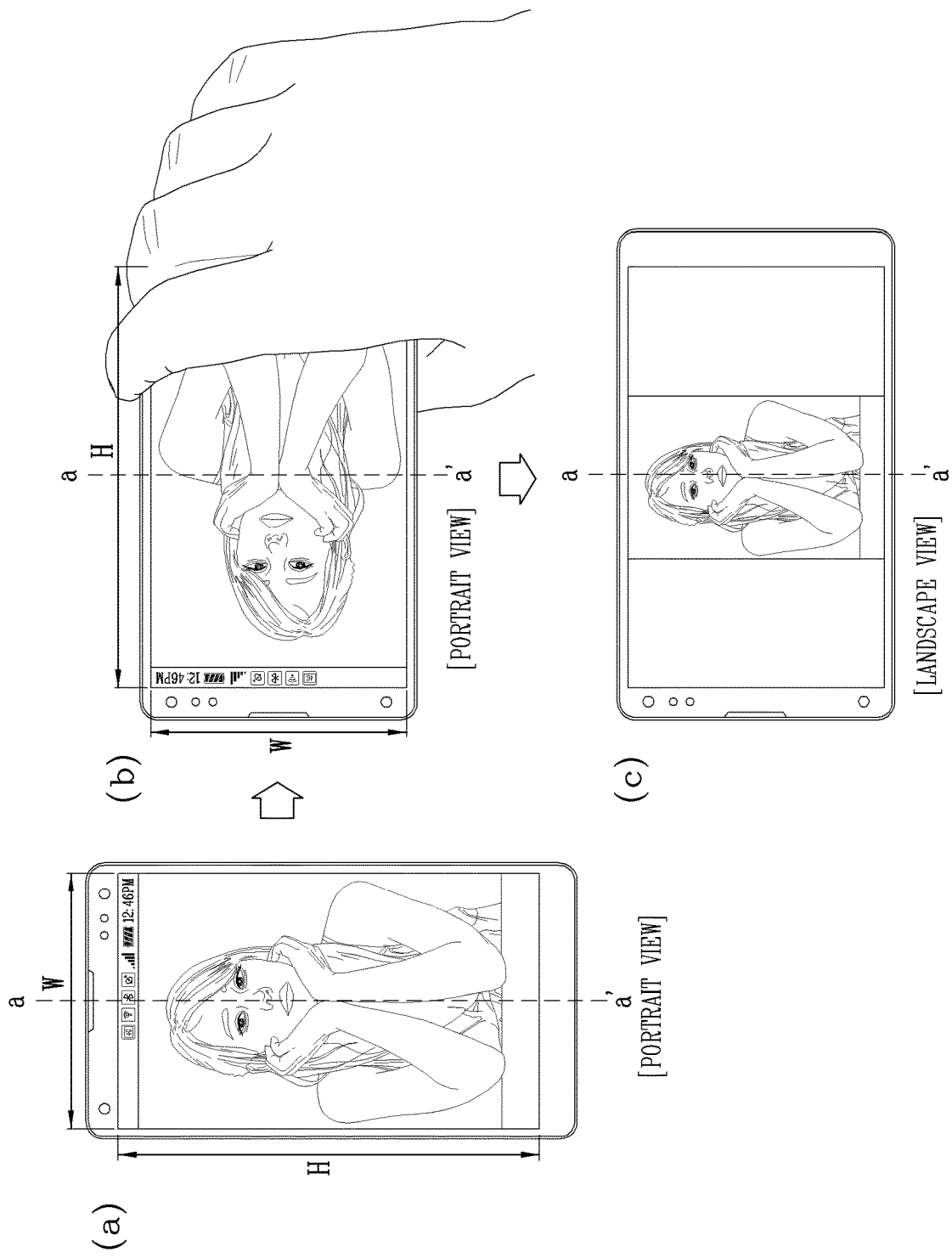
Figure 10B:
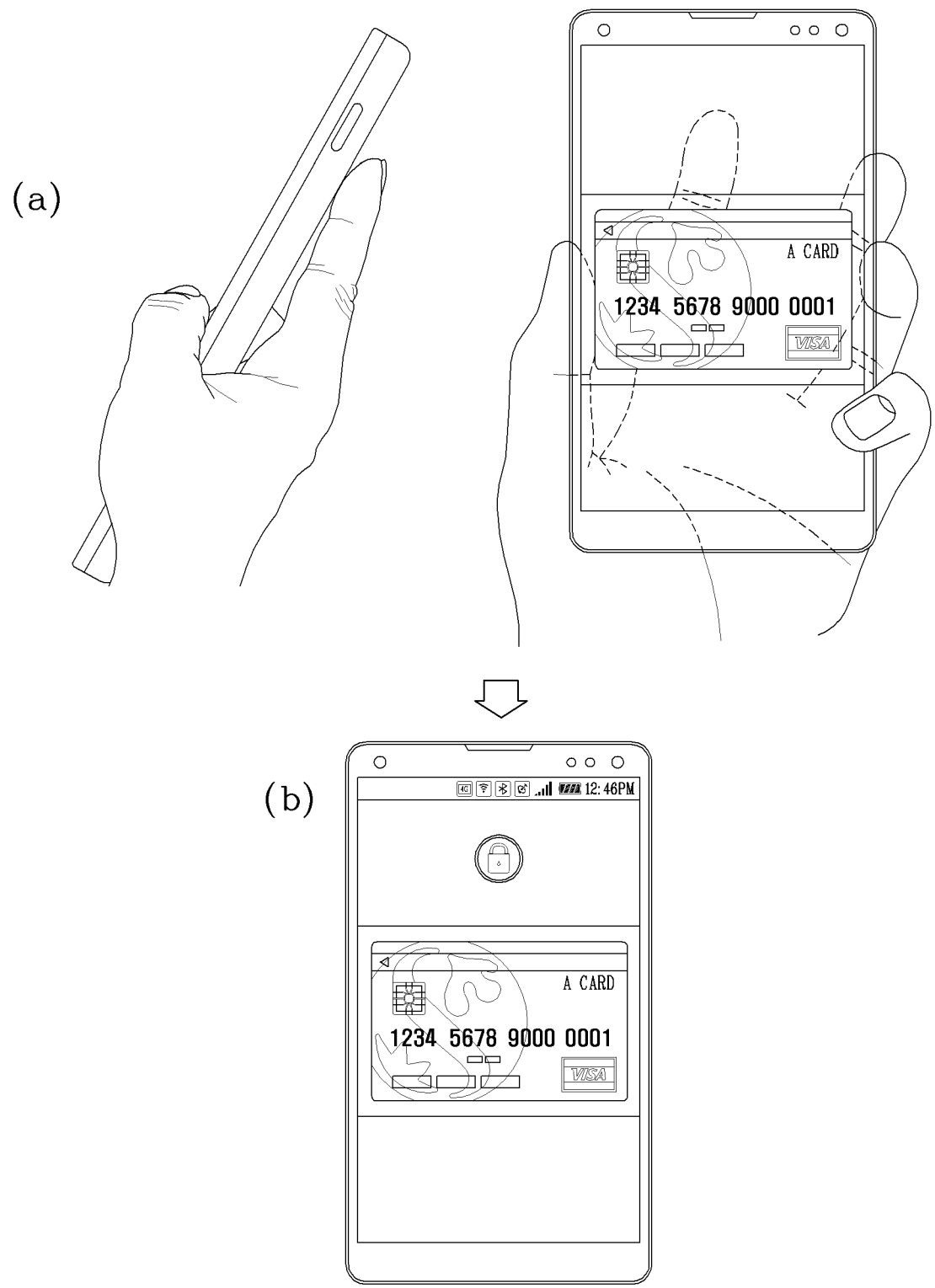

Referring to (a) of FIG. 10A, the touch screen may have a rectangular shape in which a first side thereof is longer than a second side thereof. In this case, the first side may be referred to as a height h or a portrait, and the second side may be referred to as a width w or a landscape.

The main body may take either a portrait posture in which the height h of the touch screen is parallel to a gravitational direction a-a' or a landscape posture in which the height h is perpendicular to the gravitational direction a-a'.

The landscape view mode is a mode in which visual information displayed on the touch screen is displayed in a width w direction while the main body is in the landscape posture. The portrait view mode is a mode to display visual information displayed on the touch screen in a height h direction.

The controller 180 may set visual information to be displayed only in the portrait view mode even when the posture of the main body is changed. In this case, as illustrated in (a) and (b) of FIG. 10A, the controller 180 may display the image in the portrait view mode even when the main body is changed from the portrait position to the landscape position. That is, a display direction of the image may not be changed.

In this case, as illustrated in (c) of FIG. 10A, the controller 180 may temporarily execute the landscape view mode when a user input is sensed by the grip sensor within a preset time after the posture of the main body is changed. In this case, when the posture of the main body is changed from a second posture to a first posture again, the controller 180 may stop the landscape view mode and execute the portrait view mode again.

In addition, the controller 180 may execute a lock mode function in which the terminal does not operate in response to a touch input when a user input is sensed by the grip sensor within a preset time after fingerprint information is input by the finger scan sensor. For example, as illustrated in (a) and (b) of FIG. 10B, the controller 180 may execute the lock mode function based on a user input sensed by the grip sensor while card information is displayed on the touch screen 151 and fingerprint information is input by the finger scan sensor. Accordingly, when the mobile terminal is transferred to another person for card payment by the mobile terminal, the present disclosure may not let the another person to arbitrarily manipulate the mobile terminal.

So far, the method for executing a function related to the state information of the mobile terminal based on a user input sensed by the grip sensor has been described. With such configuration, the user may control the mobile terminal more conveniently without direct control of the touch screen or securing the field of view.

Figure 11A:
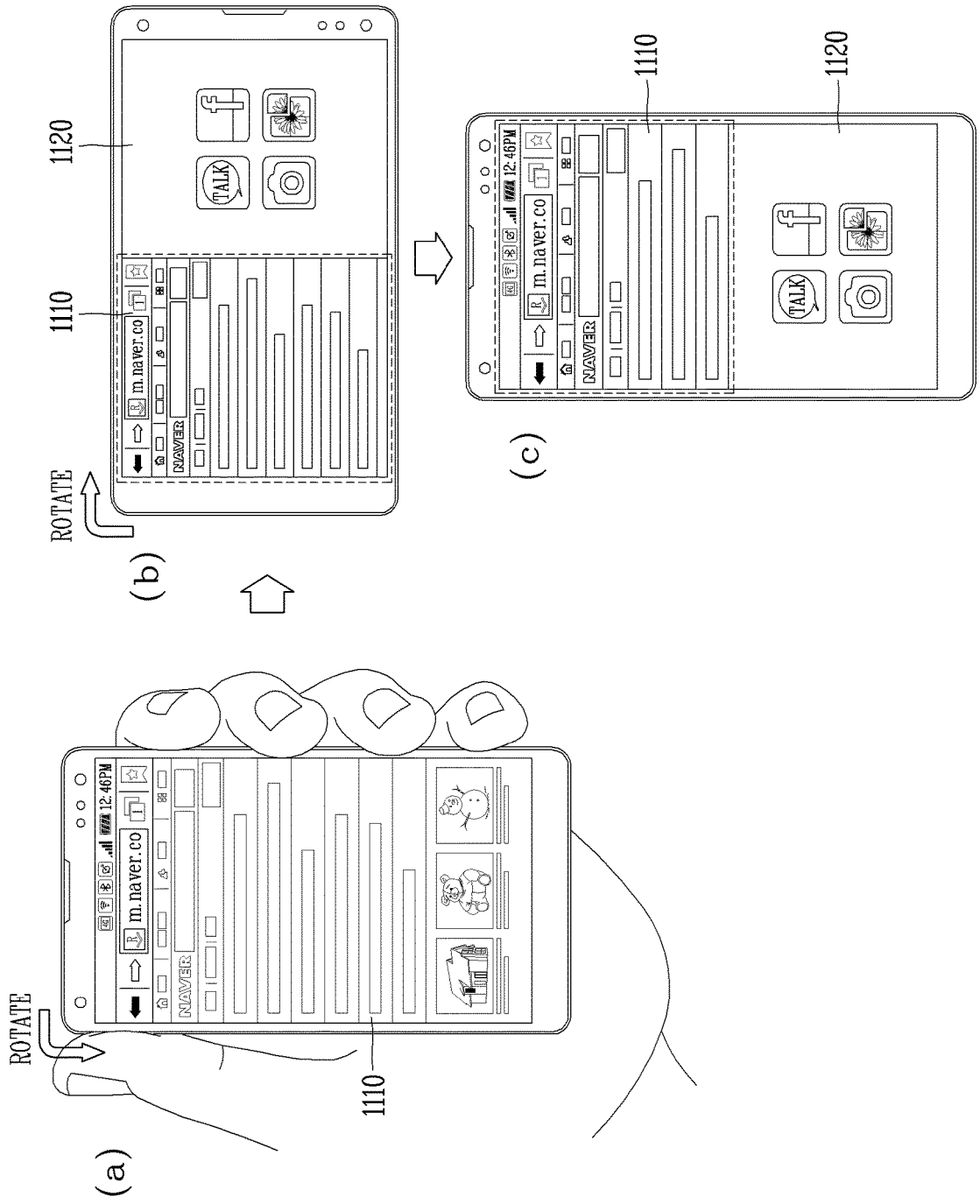
FIGS. 11A and 11B are conceptual views illustrating a method for performing multitasking by a user input sensed by a grip sensor.
Figure 11B:
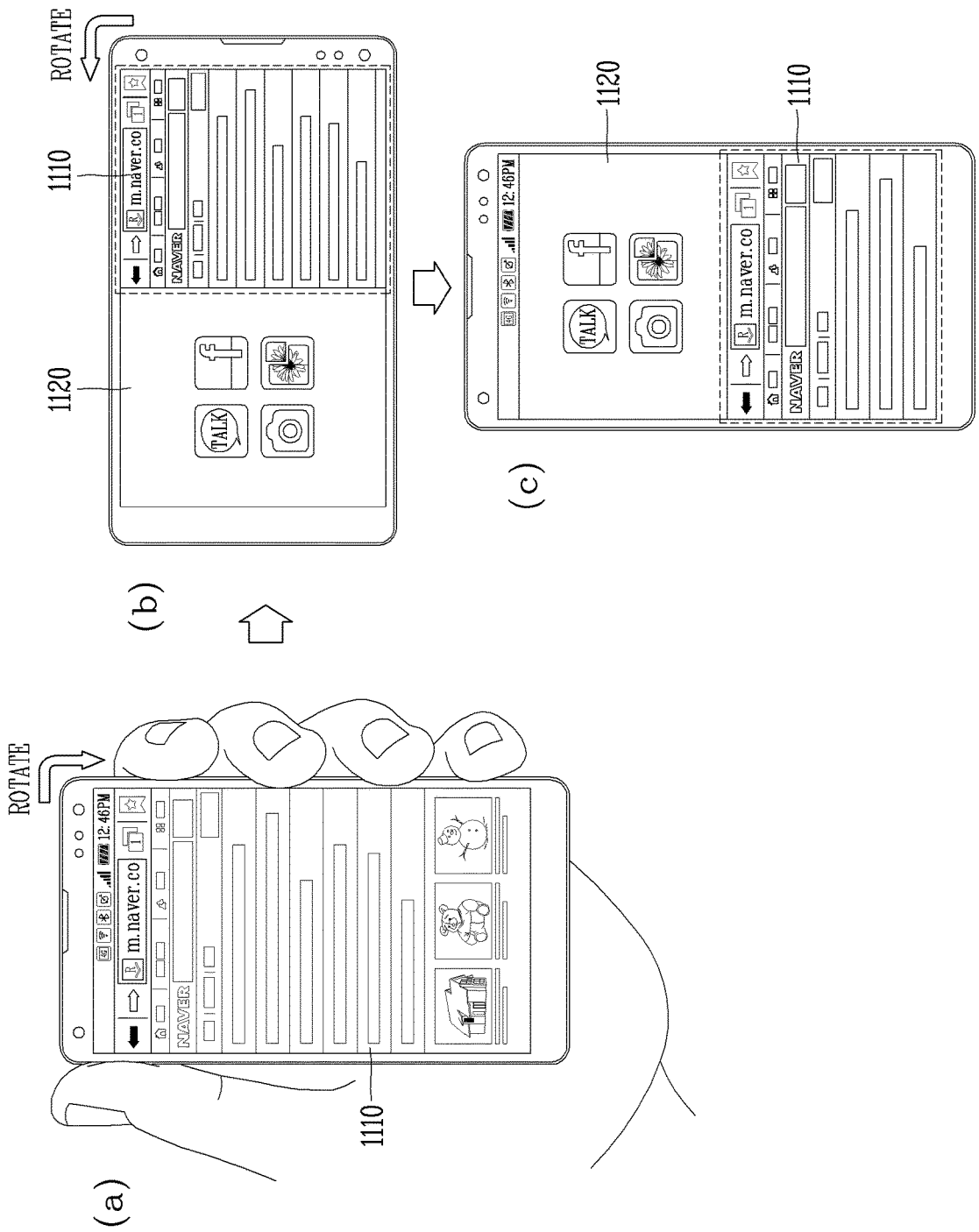

Hereinafter, a method for performing multitasking by a user input sensed by the grip sensor will be described. FIGS. 11A and 11B are conceptual views illustrating a method for performing multitasking by a user input sensed by the grip sensor.

The controller 180 may execute a multitasking function when a rotational movement of the main body is sensed while a user input is sensed by the grip sensor. The multitasking function divides the touch screen 151 into a plurality of areas, and outputs an execution screen among different applications for each divided area. In other words, it is a function to simultaneously execute a plurality of applications as well as to simultaneously provide an execution screen among the plurality of applications.

Meanwhile, when executing the multitasking function, the controller 180 may determine arrangement area of the execution screen according to a rotated direction of the terminal.

For example, as illustrated in (a) of FIG. 11A, the controller 180 may execute the multitasking function when an execution screen 1110 of a first application is displayed on the touch screen 151 and the main body rotates in a first direction (counterclockwise direction).

As illustrated in (b) of FIG. 11A, when the multitasking function is executed, the controller 180 may divide the touch screen into two areas and display the execution screen 1110 of the first application on a first area (that is, a left side based on a front surface of the touch screen). Also, an execution screen of a second application different from the first application may be displayed on a second area. The second application may be a most recently executed application among applications running in the background.

Meanwhile, as illustrated in (b) of FIG. 11A, when there is no application running in the background, the controller 180 may output icons 1120 of applications frequently used or icons of applications running in the background on the second area. The frequently used application may be determined by the number of executions of the application in the mobile terminal.

As illustrated in (c) of FIG. 11A, when the main body senses that main body is rotated in a second direction (clockwise direction) different from the first direction while the multitasking function is executed, the controller 180 may divide the touch screen again. In addition, the controller 180 may display the execution screen 1110 of the first application on a third area located adjacent to an upper end of the main body, and may output icons 1120 of frequently used applications on a fourth area located adjacent to a lower end of the main body.

In addition, an arrangement area of the execution screen in the multitasking function in a case of rotating in a direction opposite to (a) to (c) of FIG. 11A is displayed in (a) to (c) of FIG. 11B. In this case, unlike (a) to (c) of FIG. 11A, when the main body rotates in the second direction (clockwise direction), the execution screen 1110 of the first application may be displayed on the second area and the icons 1120 of the frequently used applications may be displayed on the first area. In addition, when the main body rotates in the first direction in this state, the controller 180 may display the execution screen 1110 of the first application on the third area and may display icons 1120 of the frequently used applications on the fourth area. That is, in the present disclosure, arrangement positions of an execution screen among the application when the multitasking function is executed may be determined according to a rotation direction of the main body.

The foregoing description has been given of the method for executing the multitasking function using a user input sensed by the grip sensor. Accordingly, the user can execute the multitasking function more conveniently, and can directly select an arrangement area of screen information of currently displayed execution screen before executing the multitasking function.

The mobile terminal according to the present disclosure may improve user's convenience by responding to a user input sensed by the grip sensor during execution of the editing mode to edit a plurality of pieces of visual information displayed on the touch screen and executing the function related to the plurality of pieces of visual information.

In addition, the mobile terminal according to the present disclosure may improve user's convenience by controlling the operation related to a state of the terminal in response to a user input sensed by the grip sensor.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A mobile terminal comprising:
a main body provided with a case to form an exterior;
a grip sensor arranged at a side surface of the main body and configured to sense a user grip input applied to the side surface;
a touch screen configured to display a plurality of icons associated with different functions, respectively;
a finger scan sensor configured to sense a user fingerprint to unlock the mobile terminal; and
a controller configured to:
control an operation of the mobile terminal related to at least one of the plurality of icons based on the user grip input sensed by the grip sensor, and
generate a control command to control different operations of the mobile terminal based on a first user input applied at a first side surface position of the main body and a second user input applied at a second side surface position of the main body,
wherein the controller is further configured to:
display a plurality of pieces of visual information on the touch screen;
in response to sensing the user fingerprint while in a locked state, unlock the mobile terminal; and
in response to a user input being sensed by the grip sensor while the mobile terminal is in an unlocked state, execute a lock function to transition the mobile terminal from the unlocked state to the locked state.

2. The mobile terminal of claim 1, wherein the controller is further configured to:
in response to sensing a user input via the grip sensor while in an editing mode for editing the plurality of pieces of visual information, execute a select function for setting at least one of the plurality of pieces of visual information to an editable-selected state.

3. The mobile terminal of claim 1, wherein the controller is further configured to:
determine a specific number of pieces of visual information to be displayed on the touch screen based on a preset type of touch input being applied to the touch screen, and
execute the select function to set the specific number of pieces of visual information to the editable-selected state, based on the user input being sensed by the grip sensor while the specific number of pieces of visual information are displayed on the touch screen.

4. The mobile terminal of claim 1, wherein the controller is farther configured to:
display several items of list information containing a plurality of items on the touch screen,
in response to a drag input being applied to the touch screen while the several items are displayed on the touch screen, execute a scroll function to scroll the list information, and after executing the scroll function, select items displayed on the touch screen from among the plurality of items contained in the list information when the user input is sensed by the pip sensor.

5. The mobile terminal of claim 1, wherein the controller is further configured to:
in response to sensing the user input by the grip sensor while the at least one of the plurality of pieces of visual information is set to the editable-selected state, execute a release function to change the at least one of the plurality of pieces of visual information from the editable-selected state to an unselected state.

6. The mobile terminal of claim 1, wherein the plurality of pieces of visual information are associated with different functions, respectively, and
wherein the controller is further configured to activate or deactivate all of the different functions based on the user input being sensed by the grip sensor.

7. The mobile terminal of claim 1, wherein the controller is further configured to:
in response to sensing the user input by the grip sensor while an input window is displaying characters input by a user control command on the touch screen, select the characters displayed in the input window and display the characters in a selected state.

8. The mobile terminal of claim 1, further comprising:
an acceleration sensor configured to sense an acceleration of the main body for controlling the touch screen to display a portrait view while the mobile terminal is in a portrait posture and a landscape view while the mobile terminal is in a landscape posture,
wherein the controller is further configured to:
display the portrait view on the touch screen while the terminal is in the portrait posture,
in response to a position of the mobile terminal transitioning from the portrait posture to the landscape posture, display the landscape view on the touch screen, and
in response to sensing the user input by the grip sensor within a predetermined period of time after the transitioning from the portrait posture to the landscape posture, return the touch screen to displaying the portrait view on the touch screen while the mobile terminal is in the landscape posture.

9. The mobile terminal of claim 1, wherein the controller is further configured to:
when the user input is sensed by the grip sensor while first visual information is displayed on the touch screen, execute a multi-window function and divide the touch screen into a plurality of areas and display different visual information on the plurality of areas according to a rotation direction of the main body, and
determine a specific area from among the plurality of areas based on the rotation direction of the main body and display the first visual information in the specific area.

10. The mobile terminal of claim 9, wherein the controller is further configured to:
display second visual information on another area among the plurality of areas while executing the multi-window function, and
wherein the second visual information includes an execution screen of a most recently executed application among applications running in a background, icons of the applications running in the background, or icons corresponding to frequently used applications.

11. A method of controlling a mobile terminal, the method comprising:
controlling, by a controller in the mobile terminal, an operation of the mobile terminal related to at least one of a plurality of icons displayable by a touch screen of the mobile terminal based on a user grip input sensed by a grip sensor arranged at a side surface of a main body of the mobile terminal;
generating, by the controller, a control command to control different operations of the mobile terminal based on a first user input applied at a first side surface position of the main body and a second user input applied at a second side surface position of the main body,
wherein,
the mobile terminal further includes a fingerprint sensor, and
the controlling the operation of the mobile terminal based on the user grip input further comprises:
receiving fingerprint information through the fingerprint sensor; and
when the user grip input is applied after the fingerprint information is input, executing a lock function to transition the mobile terminal from an unlocked state to a locked state.

12. The method of claim 11, further comprising:
displaying a plurality of pieces of visual information on the touch screen; and
in response to sensing a user input via, the grip sensor while in an editing mode for editing the plurality of pieces of visual information, executing a select function for setting at least one of the plurality of pieces of visual information to an editable-selected state.

13. The method of claim 12, further comprising:
determining, by the controller, a specific number of pieces of visual information to be displayed on the touch screen based on a preset type of touch input being applied to the touch screen; and
executing, by the controller, the select function to set the specific number of pieces of visual information to the editable-selected state, based on the user input being sensed by the grip sensor while the specific number of pieces of visual information are displayed on the touch screen.

14. The method of claim 12, further comprising:
displaying several items of list information containing a plurality of items on the touch screen;
in response to a drag input being applied to the touch screen while the several items are displayed on the touch screen, executing, by the controller, a scroll function to scroll the list information; and
after executing the scroll function, selecting, by the controller, items displayed on the touch screen from among the plurality of items contained in the list information when the user input is sensed by the grip sensor.

15. The method of claim 12, further comprising:
in response to sensing the user input by the grip sensor while the at least one of the plurality of pieces of visual information is set to the editable-selected state, executing, by the controller, a release function to change the at least one of the plurality of pieces of visual information from the editable-selected state to an unselected state.

16. The method of claim 12, wherein the plurality of pieces of visual information are associated with different functions, respectively, and wherein the method further comprises activating or deactivating all of the different functions based on the user input being sensed by the grip sensor.

17. The method of claim 12, further comprising:
in response to sensing the user input by the grip sensor while an input window is displaying characters input by a user control command on the touch screen, selecting, by the controller, the characters displayed in the input window and displaying the characters in a selected state.

* * * * *